(12) United States Patent
Itano et al.

(10) Patent No.: US 7,025,239 B2
(45) Date of Patent: Apr. 11, 2006

(54) OPTICAL FIBER CLEAVER

(75) Inventors: Michael M. Itano, Seattle, WA (US);
Harley B. Lang, III, Kirkland, WA (US); Thomas J. Luenow, Lynnwood, WA (US); Patrick S. McNutt, Carnation, WA (US); Michael S. Silbaugh, Redmond, WA (US)

(73) Assignee: Leviton Manufacturing Co., Inc., Little Neck, NY (US)

( * ) Notice: Subject to any disclaimer, the term of this patent is extended or adjusted under 35 U.S.C. 154(b) by 0 days.

(21) Appl. No.: 10/303,200

(22) Filed: Nov. 25, 2002

(65) Prior Publication Data

US 2004/0099121 A1 May 27, 2004

(51) Int. Cl.
*B26F 3/00* (2006.01)

(52) U.S. Cl. .......................... 225/95; 225/96; 225/103; 30/109; 30/113; 81/9.4

(58) Field of Classification Search .................. 83/879, 83/20, 21; 225/95, 96, 103, 1–5, 96.5; 29/564, 29/564.6, 564.8, 566.1–566.3, 862; 81/9.4–9.44, 81/9.51; 30/109, 113; 131/248; 385/134, 385/85

See application file for complete search history.

(56) References Cited

U.S. PATENT DOCUMENTS

| 2,521,854 A | 9/1950 | King |
| 3,903,598 A | 9/1975 | Lefebvre |
| 4,216,004 A | 8/1980 | Brehm et al. |
| 4,621,754 A | 11/1986 | Long et al. |
| 4,644,647 A | 2/1987 | Szostak et al. |
| 4,852,244 A | 8/1989 | Lukas |
| 4,976,390 A | 12/1990 | Gee et al. |
| 5,031,321 A | 7/1991 | Briscoe |
| 5,063,672 A | 11/1991 | Grois et al. |

(Continued)

FOREIGN PATENT DOCUMENTS

GB 2046242 A 11/1980

(Continued)

*Primary Examiner*—Allan N. Shoap
*Assistant Examiner*—Phong Nguyen
(74) *Attorney, Agent, or Firm*—George C. Rondeau, Jr.; Davis Wright Tremaine LLP

(57) ABSTRACT

A device for cleaving optical fibers having a housing with an internal chamber, a fiber alignment member removably connected to the housing and a fiber cutting member supported by the housing. The alignment member has an opening sized to receive the ferrule of a fiber optic connector and has a stop proximate to the inward end of an opening to engaged the ferrule distal end. The alignment member is quickly interchangeable with another sized and arranged to handle the ferrule of a different type or size connector. The opening is sized to receive ferrule with an optical fiber to be cleaved, and permits the fiber to extend inward beyond the inward end of the opening and into the housing internal chamber. The fiber cutting member is mounted to the housing to cleave the fiber inserted into the opening and cause separation of a cut end of the fiber within the housing internal chamber, and is quickly removable for replacement when the alignment member is disconnected from the housing if a blade thereof is damaged or worn. The alignment member has a user operable lock to unlock the alignment member from the housing. The lock has a release positioned within the housing internal chamber for access by a user through a housing opening sized to provide access to the housing internal chamber. An endcap closes the housing opening and hold a spare fiber cutting member.

27 Claims, 14 Drawing Sheets

U.S. PATENT DOCUMENTS

| | | |
|---|---|---|
| 5,088,637 A | 2/1992 | Teurlings |
| 5,123,581 A | 6/1992 | Curtis et al. |
| 5,125,549 A | 6/1992 | Blackman et al. |
| 5,301,868 A | 4/1994 | Edwards et al. |
| 5,345,952 A | 9/1994 | Nielander |
| 5,351,333 A | 9/1994 | Chambers |
| 5,360,464 A | 11/1994 | Yamauchi et al. |
| 5,395,025 A | 3/1995 | Borer et al. |
| 5,460,311 A * | 10/1995 | Fan .................... 225/96 |
| 5,501,385 A | 3/1996 | Halpin |
| 5,563,974 A | 10/1996 | Carpenter et al. |
| 5,838,850 A | 11/1998 | Mansfield et al. |
| 5,946,986 A | 9/1999 | Dodge et al. |
| 5,949,938 A | 9/1999 | Tabur et al. |
| 6,023,996 A | 2/2000 | Dodge et al. |
| 6,189,757 B1 | 2/2001 | Yoshida et al. |
| 6,628,879 B1 * | 9/2003 | Robinson et al. ........... 385/134 |
| 6,688,207 B1 * | 2/2004 | Tabeling .................... 83/679 |
| 6,695,191 B1 * | 2/2004 | Tabeling .................... 225/95 |
| 2004/0040959 A1 * | 3/2004 | Menceles .................. 220/23.2 |

FOREIGN PATENT DOCUMENTS

| | | |
|---|---|---|
| GB | 2308361 | 6/1997 |
| JP | 59142503 | 8/1984 |
| JP | 04035899 A | 2/1992 |
| WO | WO 91 03750 | 3/1991 |
| WO | WO 98 47030 | 10/1998 |

* cited by examiner

OPTICAL FIBER CLEAVER

TECHNICAL FIELD

The present invention relates generally to a device for cleaving optical fibers, and more particularly, for cleaving optical fibers for use with different connector types while allowing replacement of damaged cleaving blades.

BACKGROUND OF THE INVENTION

Optical fibers are frequently used in communications systems, generally, where light energy is transmitted very long distances with little or no energy losses. Devices coupled to optical fibers and coupling of optical fibers together require cutting and subsequent connecting of the optical fibers. Unacceptable loss of light energy at a coupling is detrimental to most transmissions and is consequently undesirable.

A junction between light fibers has generally a glass-to-glass interface where one fiber precisely abuts another fiber to minimize energy losses and signal distortions introduced at these junctions. Miles of optical fibers are installed in locations of varying conditions that demand tools to cleave optical fiber, which consistently provide acceptable cleaved fiber and ease of operation.

Conventional optical fiber assemblies include an optical fiber covered by a sheath. An end portion of the optical fiber of a first optical fiber assembly is typically joined to an end portion of the optical fiber of a second optical fiber assembly through the use of mating fiber optic connectors. When fiber optic connectors are used, the sheath of the end portion of the optical fiber assembly is removed to expose the optical fiber of the end portion as an unsheathed optical fiber. The unsheathed optical fiber is then inserted into a connector with the unsheathed optical fiber extending through a ferrule thereof. A portion of the sheathed optical fiber of the optical fiber assembly adjacent the unsheathed optical fiber is also inserted into the connector to securely fix the optical fiber assembly to the connector. In other style connectors, the optical fiber assembly may be securely fixed to the connector by being epoxy glued within the connector or by the connector grasping the unsheathed optical fiber.

Conventional fiber cleavers are used to trim to a desired length the unsheathed optical fiber of the optical fiber assembly that extends beyond the ferrule of the connector after the optical fiber assembly has been securely fixed in the connector. Such connectors include ST, SC and FC connectors. The unsheathed optical fiber extending beyond the ferrule of the connector is usually trimmed after the optical fiber assembly is securely fixed in the connector. With other connectors, the unsheathed optical fiber of the optical fiber assembly must be cleaved to the desired length prior to being inserted into the connector which requires another style conventional fiber cleaver be used.

One fiber cleaver illustrated in FIGS. 1 and 2, which is the subject matter of U.S. patent application Ser. No. 09/414,581, filed Oct. 8, 1999, entitled "Optical Fiber Cleaver," includes a housing assembly having an opening therein for receiving the ferrule of the connector and the unsheathed optical fiber to be trimmed which extends from the ferrule. The fiber cleaver also has components within its housing assemblies configured to bend and cleave the unsheathed optical fiber. Positioning components are disposed in close proximity to the opening of the housing assembly to control positioning of the ferrule and consequential positioning of the unsheathed optical fiber within the housing assembly so as to leave a predetermined, exposed length, of the unsheathed optical fiber extending beyond the ferrule after cleavage of a free end portion of the unsheathed optical fiber.

Due to construction details of conventional fiber cleavers, including use of such positioning components, the conventional fiber cleaver is usually suitable for only one type category of fiber optic connector. Further, if the diameter or length of the connector ferrule used for a particular type connector should not be the proper size, the fiber cleaver may not work satisfactorily, requiring the use of another fiber cleaver with the proper size and located housing opening and positioning component. This may require inventorying and carrying of different fiber cleavers to use for different type connectors and for connectors of the same type but with different size ferrules. It is undesirable to provide several different fiber cleavers for each technician in the field to handle the different type and size fiber optic connectors he may encounter. This would necessitate costly manufacture and purchase of many additional fiber cleavers.

There does exist an adapter to convert the fiber cleaver of FIG. 1 designed to trim the optical fiber of a first category connector so that the same fiber cleaver can be used to trim the optical fiber of a second category connector. The adapter is shown and described in U.S. patent application Ser. No. 09/916,562, filed Jul. 26, 2001, entitled "Adapter for Optical Fiber Cleaver." Such an adapter, however, is small in size, easy to unintentionally dislodge from the fiber cleaver when using the cleaver, and will cause imprecise cuts if not fully seated to the fiber cleaver.

A single fiber cleaver that can trim the optical fibers for several different type and size connectors would be beneficial. It would also be desirable that the fiber cleaver allow cleaving of optical fibers before and after being inserted into a connector as is required for the style connector being used, and that the fiber cleaver allow cleaving of optical fibers for use in fiber splicing. Changes between modes of operation should be convenient and easily accomplished on the job site without great cost. The fiber cleaver should provide for easy and quick replacement of damaged or worn cleaving blades, and provide other construction and operational advantages over existing fiber cleavers.

SUMMARY OF THE INVENTION

The present invention resides in a device for cleaving optical fibers. The device generally includes a housing with an internal chamber, a fiber alignment member removably connected to the housing and a fiber cutting member supported by the housing. The fiber alignment member has an opening, and when the alignment member is connected to the housing the opening extends between an outward end opening exterior of the housing and an inward end communicating with the housing internal chamber. The opening is sized to receive a connector with an optical fiber to be cleaved, and permits the fiber to extend inward beyond the inward end of the opening and into the housing internal chamber. The fiber cutting member is mounted to cleave the fiber inserted into the opening and cause separation of a cut end of the fiber within the housing internal chamber.

In the illustrated embodiment of the invention, the housing includes a first slider surface portion and the alignment member includes a second slider surface portion opposing and spaced apart from the first slider surface to slidably retain the fiber cutting member therebetween. Further, the housing includes a first guide portion and the alignment member includes a second guide portion opposing and spaced apart from the housing first guide portion to movably retain the fiber cutting member therebetween.

The cleaving device is generally used with a fiber optic connector having a connector ferrule with a passageway extending to a passageway opening at a distal end of the connector ferrule and with the fiber extending through the connector ferrule passageway and out of the connector ferrule passageway opening and extending beyond the connector ferrule distal end. The opening of the alignment member is sized to receive the connector ferrule and the alignment member further includes a stop proximate to the inward end of the opening. The stop is arranged to engage the connector ferrule distal end and hold the connector ferrule distal end at a predetermined position against further movement toward the housing internal chamber with the fiber extending beyond the connector ferrule distal end and into the housing internal chamber. The fiber cutting member is located spaced apart from the stop along the length of the fiber within the housing internal chamber to cleave the fiber extending out of the connector ferrule passageway opening to a first length extending beyond the connector ferrule distal end.

The fiber cutting member may include a portion supporting a fiber cutting blade, with the alignment member retaining the blade supporting portion of the fiber cutting member in position supported by the housing when the alignment member is connected to the housing. The blade supporting portion of the fiber cutting member is removable from the housing when the alignment member is disconnected from the housing.

In the illustrated embodiment, the alignment member includes a lock engageable with the housing to lock the alignment member to the housing. The lock is user operable to unlock the alignment member from the housing and thereby allow the alignment member to be disconnected from the housing. The housing has an opening sized to provide access to the housing internal chamber, and the lock has a release positioned within the housing internal chamber for access by a user through the housing opening. The device further includes a closure member movable between a closed position closing the housing opening to retain the cut ends of a plurality of cleaved fibers within the housing internal chamber and prevent unintentional user contact with the lock release to avoid accidental unlocking of the alignment member from the housing when the user handles the cleaving device while cleaving fibers, and an open position opening the housing opening to allow removal of the cut ends of cleaved fibers from within the housing internal chamber and to allow user contact with the lock release to unlock the alignment member from the housing.

The cleaving device can further include an actuation member movably supported by the housing and having an engagement portion positioned to engage the fiber cutting member and apply an inward force thereto to move the fiber cutting member along an inward travel path toward the fiber inserted into the opening to cleave the fiber. A user operable member is positioned for application of a user applied force thereto from the exterior of the housing and configured to apply at least a portion of the user applied force to the actuation member to supply the inward force to the fiber cutting member. A relief spring is positioned to transfer the user applied force applied to the user operable member to the actuation member to move the fiber cutting member along the inward travel path, while allowing inward movement of the user operable member relative to the actuation member when the head encounters resistance while moving along the inward travel path sufficient to exceed a spring force of the relief spring. The relief spring is positioned to compress and thereby generate the spring force as the user continues to apply the user applied force to the user operable member when the fiber cutting member encounters resistance while moving along the inward travel path sufficient to exceed the spring force.

In the illustrated embodiment, the user operable member has a shaft and the actuation member has a shaft. The user operable member and actuation member shafts are slidably connected together with the relief spring positioned to engage both the user operable member and actuation member to transfer the user applied force applied to the user operable member to the actuation member to move the fiber cutting member along the inward travel path, while allowing inward movement of the user operable member relative to the actuation member when the fiber cutting member encounters resistance while moving along the inward travel path sufficient to exceed a spring force of the relief spring. The actuation member shaft is telescopically disposed within the user operable member shaft, and the relief spring has a first end portion engaging the user operable member and a second end portion engaging the actuation member shaft. The relief spring is positioned within the user operable member shaft, and the relief spring first end portion engages the user operable member and the second end portion engages an end portion of the actuation member shaft located within the user operable member shaft.

The illustrated embodiment further includes a coil return spring having an axial opening with one or both of the actuation member shaft and the user operable member shaft extending therethrough. A first end portion of the return spring engages the user operable member shaft and a second end portion of the return spring engages the housing. The return spring is arranged to apply an outward force to the fiber cutting member to move the fiber cutting member outward along an outward travel path when the inward force on the fiber cutting member is sufficiently removed.

Other features and advantages of the invention will become apparent from the following detailed description, taken in conjunction with the accompanying drawings.

DETAILED DESCRIPTION OF THE INVENTION

Figure 1:
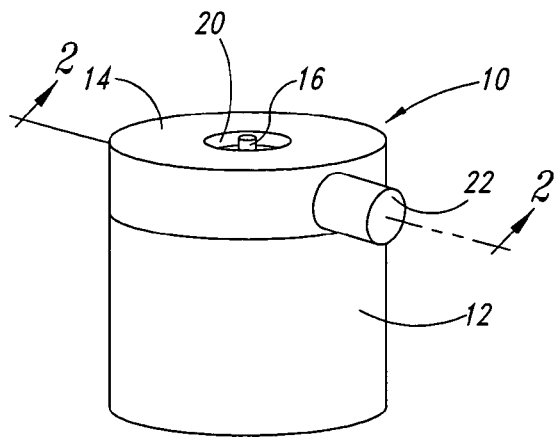
FIG. 1 is a perspective view of a prior art optical fiber cleaver, including a collection receptacle affixed to a housing containing bending and cutting means.

A fiber cleaver 10 of the prior art designed for use with fiber optic connectors is shown in FIG. 1. The fiber cleaver 10 comprising a housing assembly 14 having a housing port 16. The housing assembly 14 has a receptacle 12 attached thereto that collects severed ends of cleaved fibers.

Figure 2:
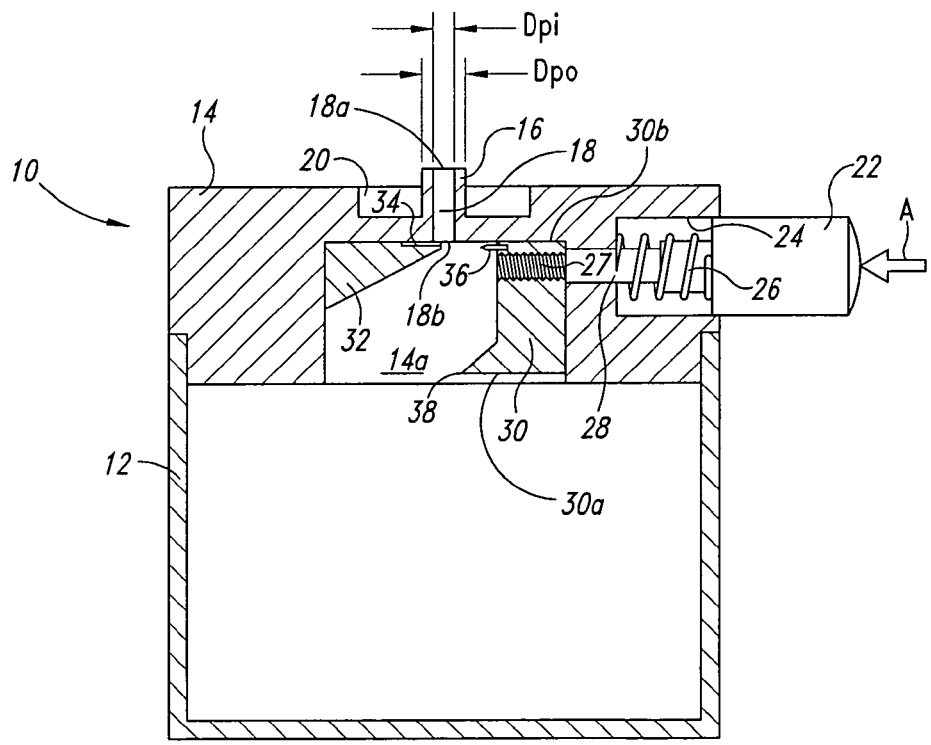
FIG. 2 is a cross-sectional view of the prior art optical fiber cleaver of FIG. 1 taken substantially along line 2—2 of FIG. 1.

The housing assembly 14 is shown in greater detail in FIG. 2. In the depicted embodiment, the housing port 16 has a tubular shape with an outer diameter, $D_{po}$, and an inner diameter, $D_{pi}$. The housing port 16 has an elongated port opening 18 with a first end 18a and a second end 18b. An annular recess 20 is machined into the housing assembly 14, which is made of aluminum or other suitable material, and the recess extends about the housing port 16. The housing assembly 14 is shown in FIG. 2 with the receptacle 12 affixed to the housing assembly by friction fit, threaded connection, or other suitable connection. The housing assembly 14 contains a housing chamber 14a in which occurs bending and cleaving of the unsheathed free end portion of the optical fiber protruding from the ferrule of a fiber optic connector as will be described in greater detail below. Within the housing chamber 14a, positioned at a predetermined depth from the second end 18b of the port opening 18, is a stop 34, cast or machined into a support 32. The stop 34 is formed to extend as shown, partially covering the second end 18b of the port opening 18.

Positioned directly across from the support 32, as depicted in FIG. 2, are a bending and cleaving means which act upon the unsheathed free end portion of the optical fiber to be cleaved. The bending and cleaving means includes a boot-shaped head or pusher 30 having a toe 38 at a first end 30a of the pusher and a diamond blade 36 near a second end 30b of the pusher that is in close proximity to the second end 18b of the port opening 18. The pusher 30 is connected to a connecting rod 28, having a threaded end portion threadably received in a threaded recess of the pusher. The connecting rod 28 is connected at an opposite end to a plunger 22. A user pushes the plunger 22, in the direction of arrow "A" to apply an inward force through the connecting rod 28 to move the pusher 30 with the blade 36 inward. The plunger extends through a coil return spring 26 which is positioned within a cylindrical recess 24 in the housing assembly to provide a return movement of the pusher 30 within the housing chamber 14a of the housing assembly.

Figure 3A:
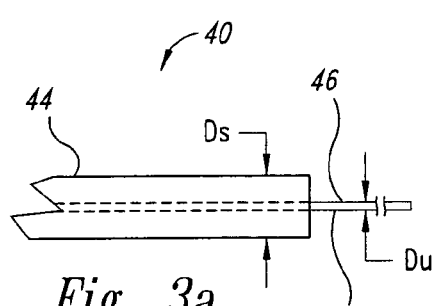
FIG. 3a is a fragmentary, enlarged scale side view of a conventional optical fiber assembly having an optical fiber covered by a sheath with an end portion of the sheath removed to expose an unsheathed optical fiber free end portion.
Figure 3B:
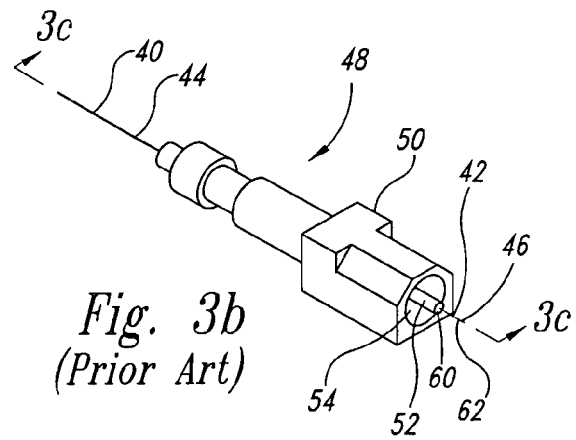
FIG. 3b is a isometric view of a portion of the optical fiber assembly of FIG. 3a securely fixed in a conventional fiber optic connector with the unsheathed optical fiber free end extending beyond a ferrule of the connector prior to trimming.
Figure 3C:
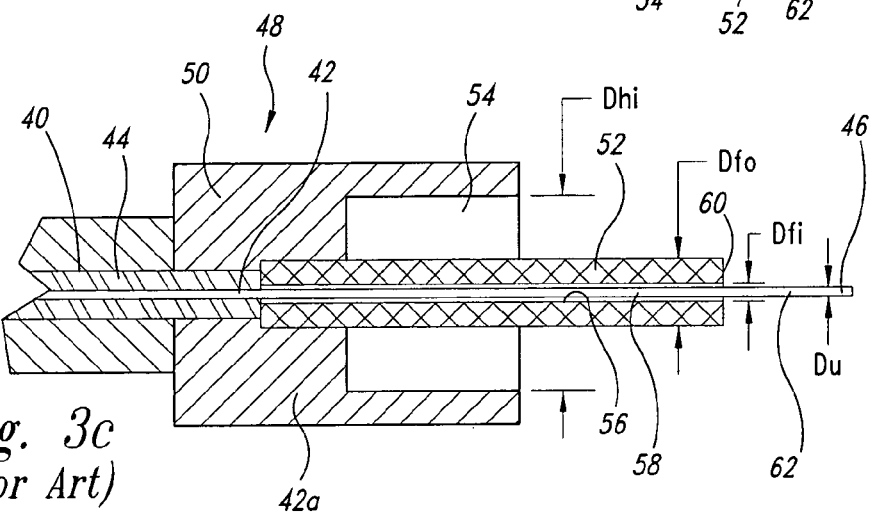
FIG. 3c is an enlarged, fragmentary, cross-sectional view of the conventional fiber optic connector of FIG. 3b taken substantially along line 3c—3c of FIG. 3b.

A conventional optical fiber assembly 40 is shown in FIG. 3a and has an optical fiber 42 with a diameter, $D_u$, and a sheath 44 with a diameter $D_s$ covering the optical fiber. In FIG. 3a, a portion of the conventional optical fiber assembly 40 is shown with the sheath 44 removed from an end portion of the optical fiber assembly, thereby exposing the optical fiber 42 and resulting in an unsheathed end portion 46 of the optical fiber assembly. In FIGS. 3b and 3c, the optical fiber assembly 40 is shown securely fixed in a conventional fiber optic connector 48 having a connector housing 50 and a connector ferrule 52 extending through a connector housing recess 54 outward from the end of the connector housing. As best seen in FIG. 3c, the connector ferrule 52 has an outer diameter, $D_{fo}$, and a coaxial passageway 56 with an inner diameter, $D_{fi}$, sized slightly larger than the diameter, $D_u$, of the optical fiber 42 which extends through the connector ferrule.

The connector housing 50 contains a portion of the optical fiber assembly 40 having the optical fiber 42 covered by the sheath 44. A ferrule portion 58 of the unsheathed optical fiber end portion 46 of the optical fiber assembly 40 is contained within the passageway 56 of the connector ferrule 52, and the remaining portion of the unsheathed end portion extends past a distal end 60 of the connector ferrule and outside of the fiber optic connector 48 as a free end portion 62. FIGS. 3b and 3c show the free end portion 62 of the unsheathed optical fiber end portion 46 extending from the connector ferrule 52 by an amount greater than appropriate for use of the fiber optic connector 48 (i.e., prior to trimming or cleaving with the bending and cleaving means). The fiber cleaver 10 is used to cleave off some of the free end portion 62 of the unsheathed optical fiber end portion 46 of the optical fiber assembly 40.

Figure 4:
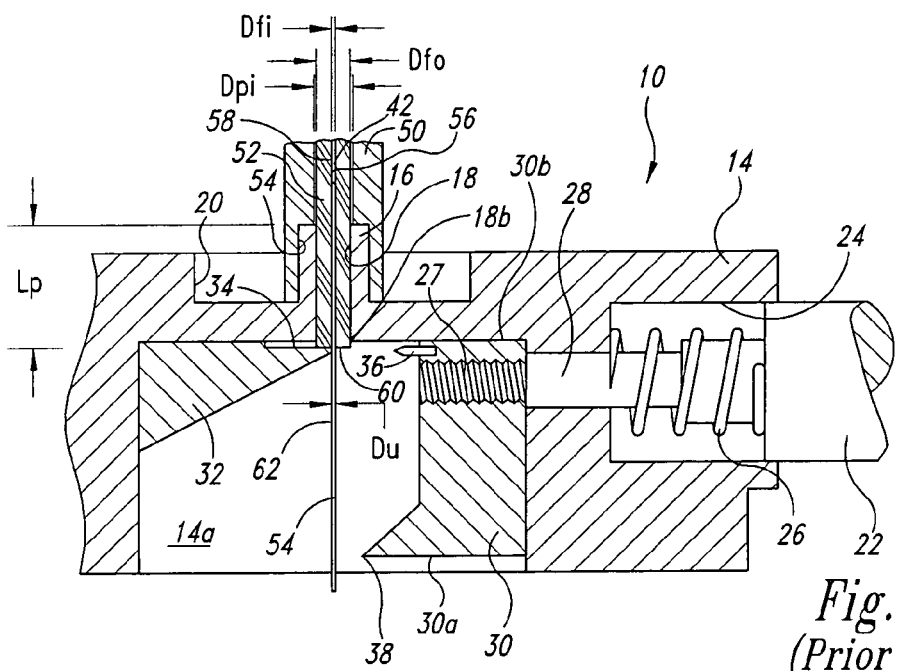
FIG. 4 is a fragmentary, enlarged, cross-sectional view of the prior art optical fiber cleaver of FIG. 2 with the collection receptacle removed, showing the bending and cutting means and showing a portion of the conventional connector ferrule with the unsheathed optical fiber free end portion inserted into an opening in the optical fiber cleaver prior to bending and cutting, the connector ferrule having an end portion of the unsheathed optical fiber extending therefrom.

FIG. 4 is an enlarged, cross-sectional view of the housing assembly 14, showing the fiber optic connector 48 positioned on the fiber cleaver 10, with the housing port 16 seated within the connector housing recess 54. When so positioned, the connector ferrule 52 extends through the port opening 18 of the housing port 16 from the first end 18a through the second end 18b of the port opening and has the distal end 60 of the connector ferrule 52 engaging the stop 34 in the housing chamber 14a. The distance from the first end 18a of the port opening 18 to the stop 34 in the housing chamber 14a is an insertion length, $L_p$. The inner diameter, $D_{pi}$, of the port opening 18 is sized slightly larger than the outer diameter, $D_{fo}$, of the connector ferrule 52. The outer diameter, $D_{po}$, of the housing port 16 is sized to be snuggly received in the connector housing recess 54, which has an inner diameter, $D_{hi}$. The housing port 16 supports and aligns in a generally coaxial alignment the connector ferrule 52 and the unsheathed optical fiber end portion 46 extending through and out of the connector ferrule with the port opening 18.

Figure 7:
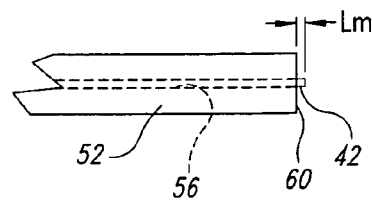
FIG. 7 is a fragmentary, enlarged scale side view of the ferrule of the conventional connector fiber optic connector of FIG. 3c with the unsheathed free end portion trimmed using the prior art optical fiber cleaver of FIG. 1.

The free end portion 62 of the unsheathed optical fiber end portion 46 extends beyond the stop 34 and into the housing chamber 14a. As a representative example, if the optical fiber 42 of the optical fiber assembly 40 has the typical diameter, $D_u$, of 125 micrometers and the optical fiber assembly is securely fixed into the fiber optic connector 48 as shown in FIG. 3b, after the fiber cleaver 10 has cleaved the free end portion 62 of the unsheathed optical fiber end portion 46, the free end portion will protrude past the distal end 60 of the connector ferrule 52 by a predetermined miniscule amount, $L_m$ of 0.004 inches (100 micrometers) as shown in FIG. 7.

Before cleaving by the fiber cleaver 10, the uncleaved free end portion 62 of the unsheathed optical fiber end portion 46 must be long enough so that the toe 38 of the pusher 30 will bend the free end portion before the blade 36 contacts and scores the free end portion. To be suitable for cleaving by the fiber cleaver 10, a typical uncleaved length of the free end portion 62 of the unsheathed optical fiber end portion 46 is 40 mm, when the optical fiber assembly 40 is securely fixed in the fiber optic connector 48.

To operate the fiber cleaver 10, the plunger 22 is pushed inward once to cleave the free end portion 62 of the unsheathed optical fiber end portion 46 of the optical fiber assembly 40. As is conventional practice, the cleaved free end portion of the unsheathed optical fiber end portion 46 may then be polished at its tip 64 (see FIG. 6) with coarse abrasive film followed by polishing with fine abrasive film. The blade 36 is positioned along a longitudinal axis of the port opening 18, away from the distal end 60 of the connector ferrule 52, sufficiently to cause the cleaved free end portion of the unsheathed optical fiber end portion 46 that remains after the cleaving operation to be the predetermined miniscule amount, $L_m$. For the depicted embodiment, the blade 36 is positioned below the stop 34 about the same distance as the predetermined miniscule amount, $L_m$, (approximately 0.004 inch (100 micrometers) in the example above) so as to achieve a clean cleave and provide the desired length of the cleaved free end portion of the unsheathed optical fiber end portion 46 of the predetermined miniscule amount, $L_m$ (0.004 inch in the example above). The fiber cleaver 10 is suitable for cleaving glass fibers which are fixed in a variety of fiber optic connectors, including ST, SC and FC connectors which are presently those most frequently used.

Figure 5:
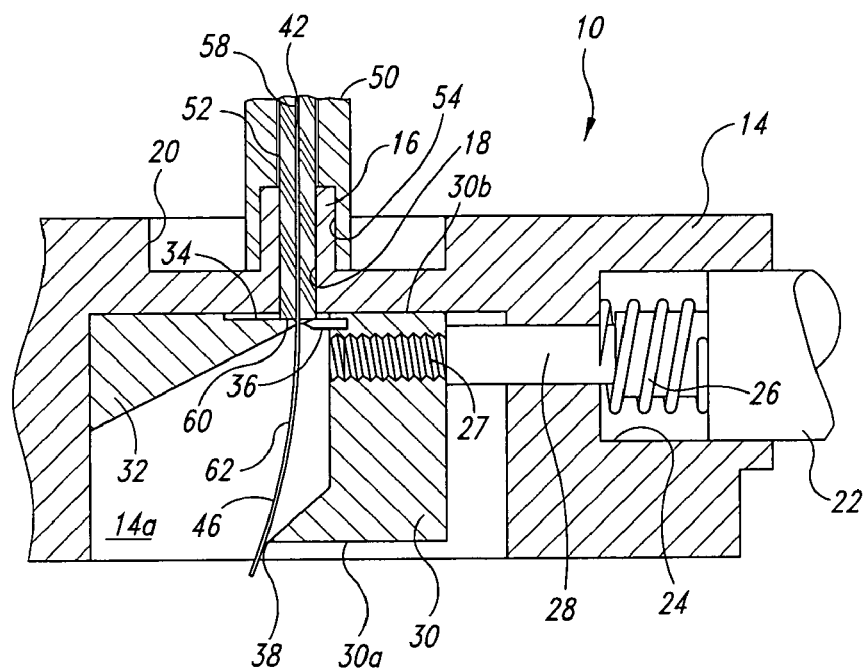
FIG. 5 shows the prior art optical fiber cleaver as shown in FIG. 4 showing an intermediate step in the bending and cutting of the unsheathed optical fiber free end portion.
Figure 6:
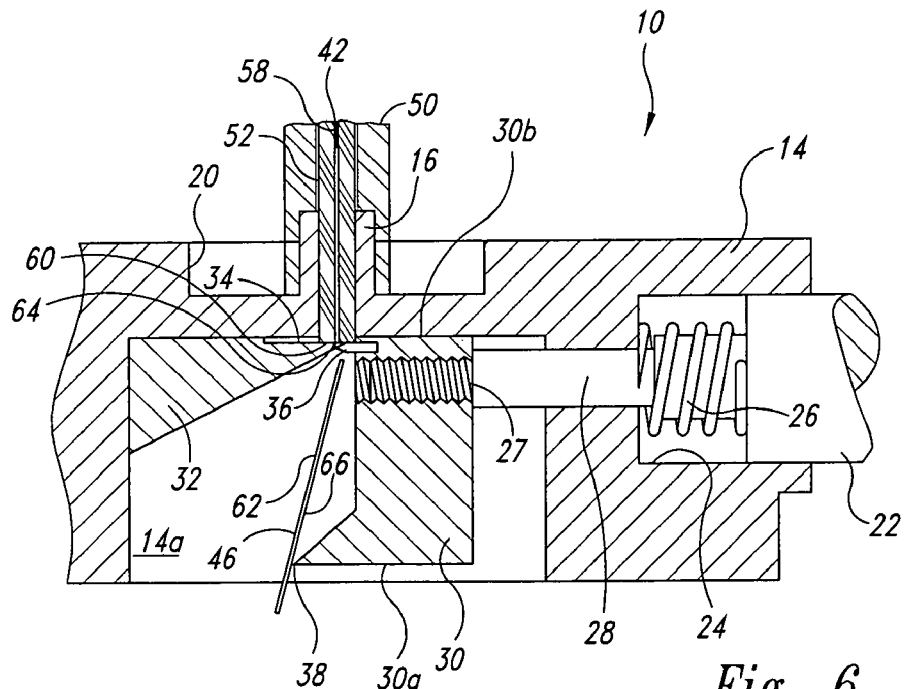
FIG. 6 shows the prior art optical fiber cleaver as shown in FIG. 4 showing completion of the bending and cutting of the unsheathed optical fiber free end portion.

In an intermediate stage of the cleaving operation using the fiber cleaver 10, as shown in FIG. 5, just before cutting by the blade 36, the plunger 22 is depressed sufficiently to bend the free end portion 62 of the unsheathed optical fiber end portion 46 by the pushing action thereon of the toe 38 of the pusher 30, thereby inducing tension in the free end portion of the unsheathed optical fiber end portion. In the final cleaving stage, as shown in FIG. 6, just after cleaving of the free end portion 62 of the unsheathed optical fiber end portion 40a1 by the blade 36, a severed portion 66 of the free end portion 62 falls away to be caught in the receptacle 12 (not shown in FIG. 6).

The support 32 having the stop 34 is depicted as a separate component in the assembly shown, bolted into the upper housing assembly 14. However, the support can be cast or machined as a unitary component together with the upper housing assembly 14.

Figure 8:
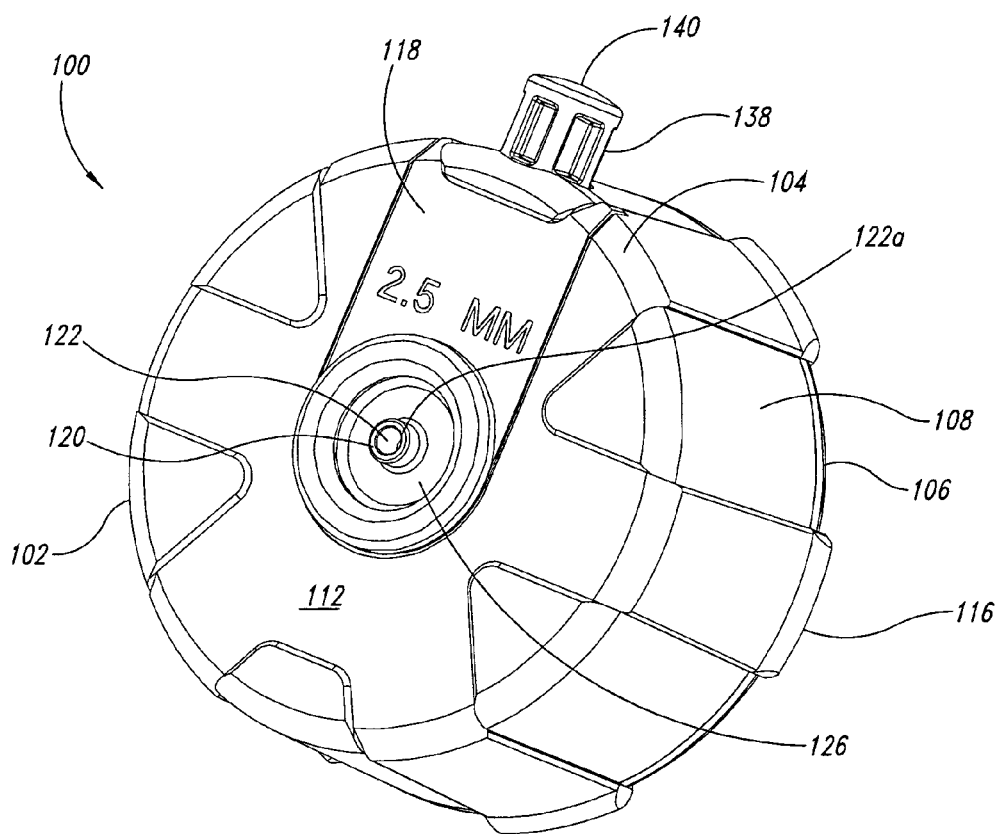
FIG. 8 is a perspective view of the optical fiber cleaver of the present invention.
Figure 9:
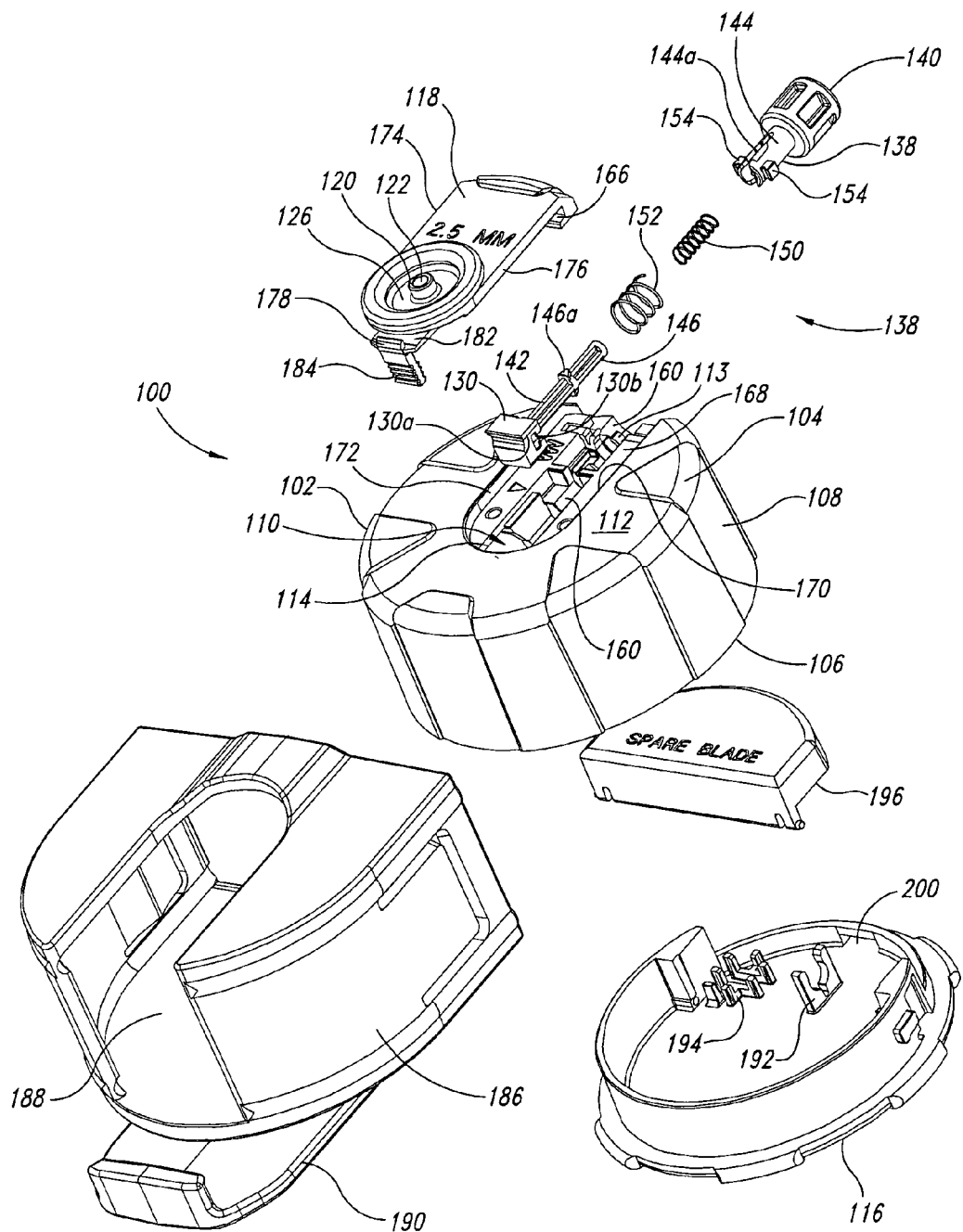
FIG. 9 is a reduced scale, exploded view of the optical fiber cleaver of FIG. 8 shown with a carrying holster.
Figure 10:
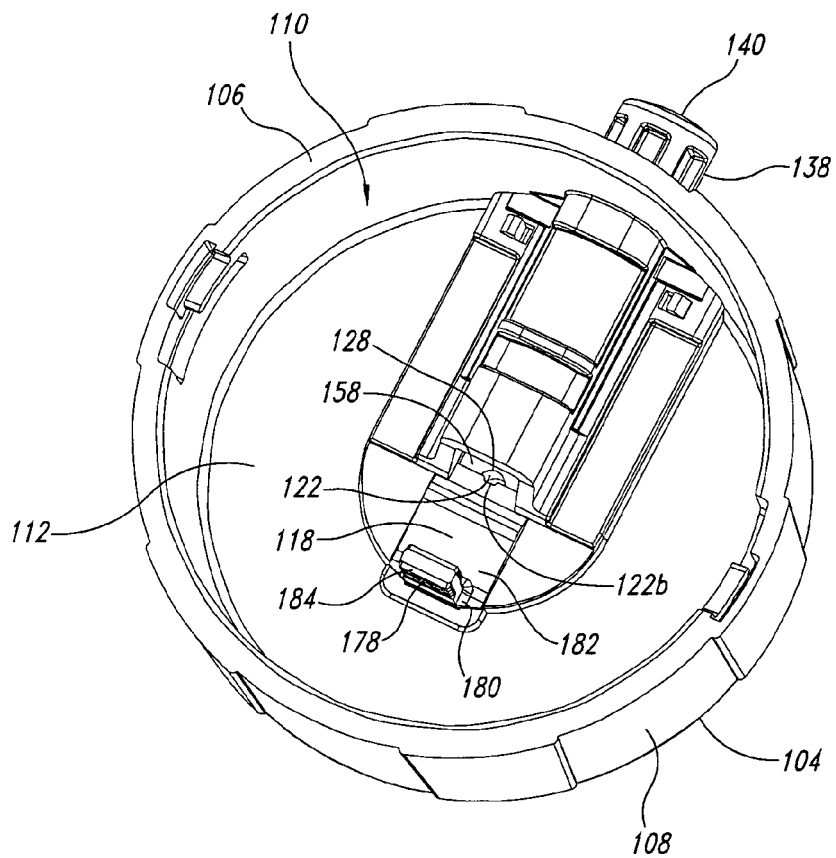
FIG. 10 is a bottom perspective view of the optical fiber cleaver of FIG. 8 with the endcap removed.
Figure 11:
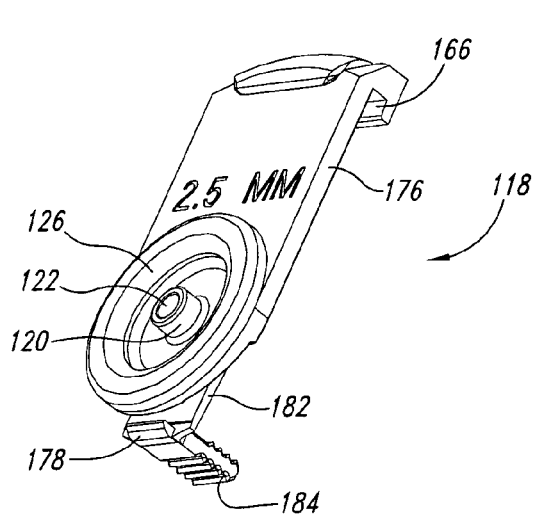
FIG. 11 is an enlarged top perspective view of the fiber support member of the optical fiber cleaver of FIG. 8 shown removed from the cleaver housing.
Figure 12:
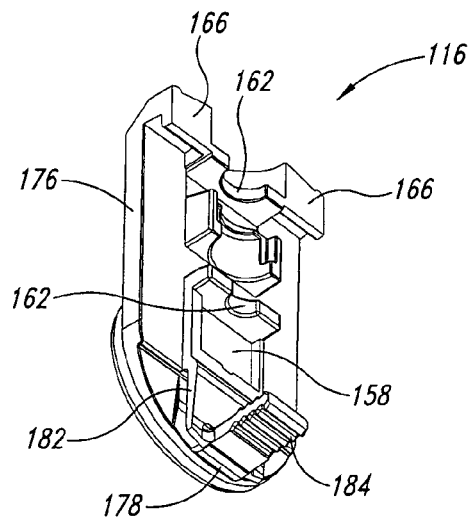
FIG. 12 is a bottom perspective view of the fiber support member of FIG. 11.
Figures 13, 14:
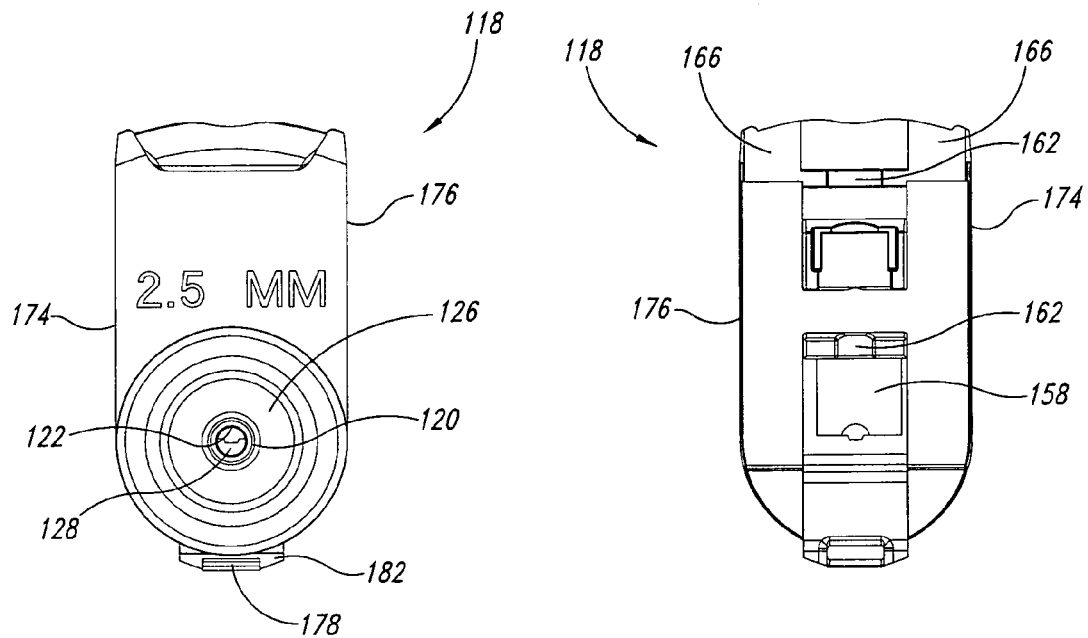
FIG. 13 is a top plan view of the fiber support member of FIG. 11.
FIG. 14 is a bottom plan view of the fiber support member of FIG. 11.
Figures 15, 16:
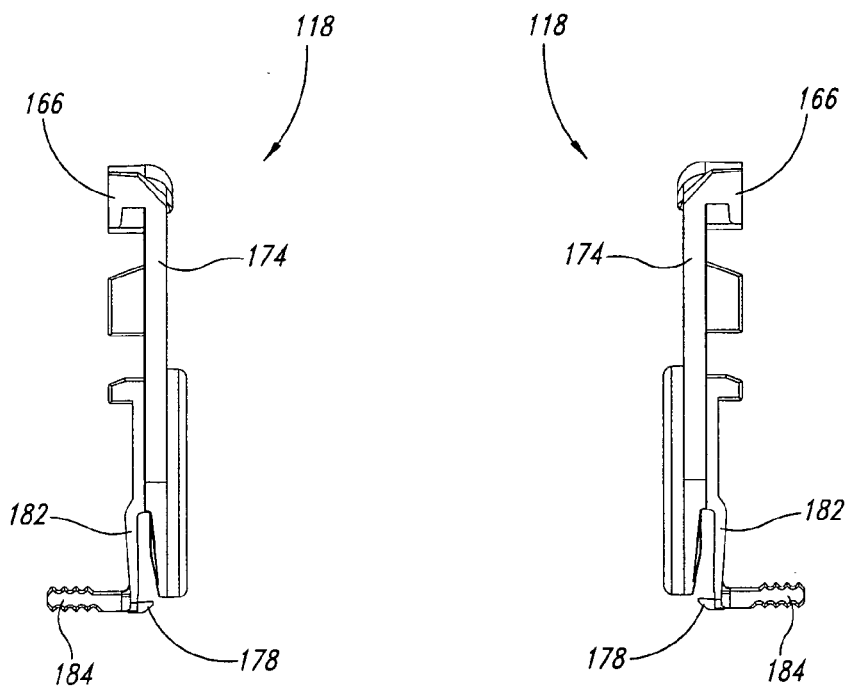
FIG. 15 is a right side, elevational view of the fiber support member of FIG. 11.
FIG. 16 is a left side, elevational view of the fiber support member of FIG. 11.
Figures 17, 18:
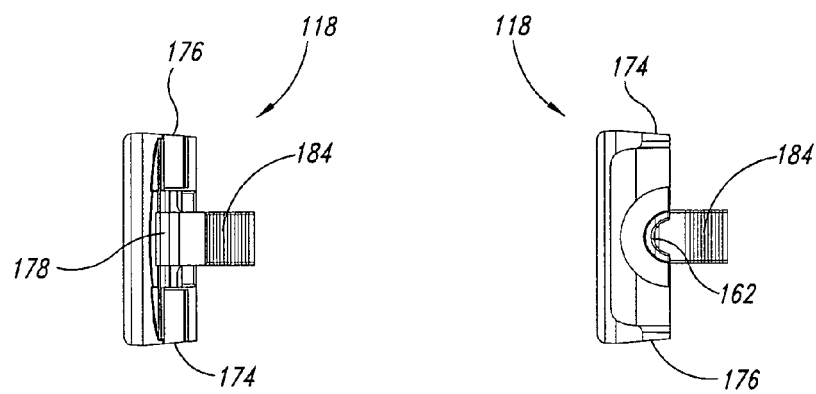
FIG. 17 is a front end, elevational view of the fiber support member of FIG. 11.
FIG. 18 is a rear end, elevational view of the fiber support member of FIG. 11.

A fiber cleaver 100 of the present invention, which in many ways has a construction and operation similar to the prior art fiber cleaver 10 described above, is illustrated in FIGS. 8–26. For brevity, only the more significant differences in construction and operation will be discussed. The fiber cleaver 100 is shown fully assembled in FIG. 8, and an exploded view is shown in FIG. 9. The fiber cleaver 100 includes a housing 102 with first and second opposing ends 104 and 106, respectively, with a generally cylindrical sidewall portion 108 spanning between the first and second housing ends to define a housing internal chamber 110. The housing 102 further has an endwall 112 across the first housing end 104 with an aperture 114 therethrough. An endcap 116 is removably connected to the housing 102 at the second housing end 106 and selectively closes the second housing end to retain severed ends (severed portion 66) of cleaved fibers within the housing internal chamber 110 and limit access to the interior of the housing internal chamber during handling of the fiber clever 100 with the endcap 116 in place. The endcap 116 is attached to the housing 102 by detents, but a snap-friction fit, threaded connection or other suitable connection can be used. The housing internal chamber 110 is best seen in FIG. 10 where the housing 102 is turned over from the view of FIG. 8 and the endcap 116 is removed.

Unlike the prior art fiber cleaver 10, there is no housing port 16 formed on the endwall of the housing 14 (such as shown in FIGS. 1 and 4) to receive the fiber optic connector 48 thereon. Instead, the fiber cleaver 100 of the present invention has a fiber support and alignment member 118 removably connected to the housing endwall 112 at the housing endwall aperture 114. The fiber support member 118 is shown removed from the housing endwall 112 in the various views of FIGS. 11–18. The fiber support member 118 has a housing port 120 with a tubular shape with the outer diameter, $D_{po}$, and an inner diameter, $D_{pi}$, the same as the housing port 16 of the prior art fiber cleaver 10. However, as will be discussed in greater detail below, with the fiber cleaver 100 of the present invention, the fiber support member 118 with one size housing port 120 sized for a particular type or size fiber optic connector 48 can be quickly and easily removed from the housing 102 and replaced with another fiber support member 118 with a different size housing port sized for a different type or size fiber optic connector to allow the same fiber cleaver 100 to be used with different types or sizes of fiber optic connectors merely by selectively using one of several available fiber support members. As shown in the drawings, each of the fiber support members 118 is marked with the diameter size of the optical fiber 42 of the optical fiber assembly 40 for which the fiber support member is designed to operate.

Figures 19, 20:
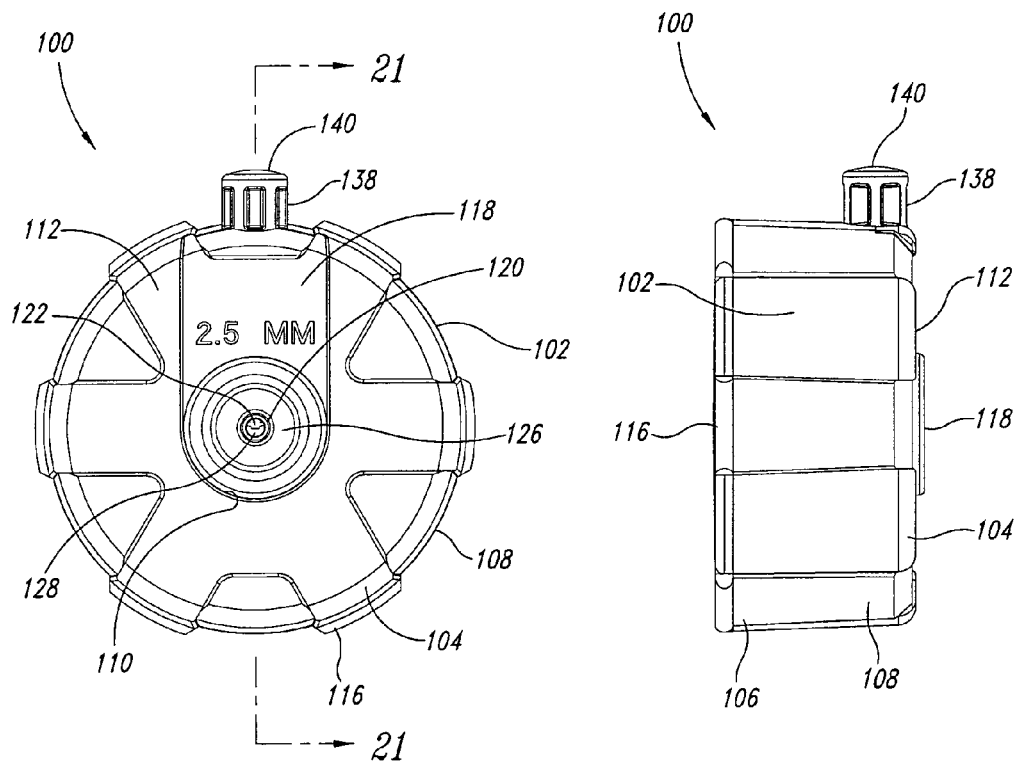
FIG. 19 is a reduced scale top plan view of the fiber optical cleaver of FIG. 8.
FIG. 20 is a reduced scale, side elevational view of the fiber optic cleaver of FIG. 8.
Figure 21:
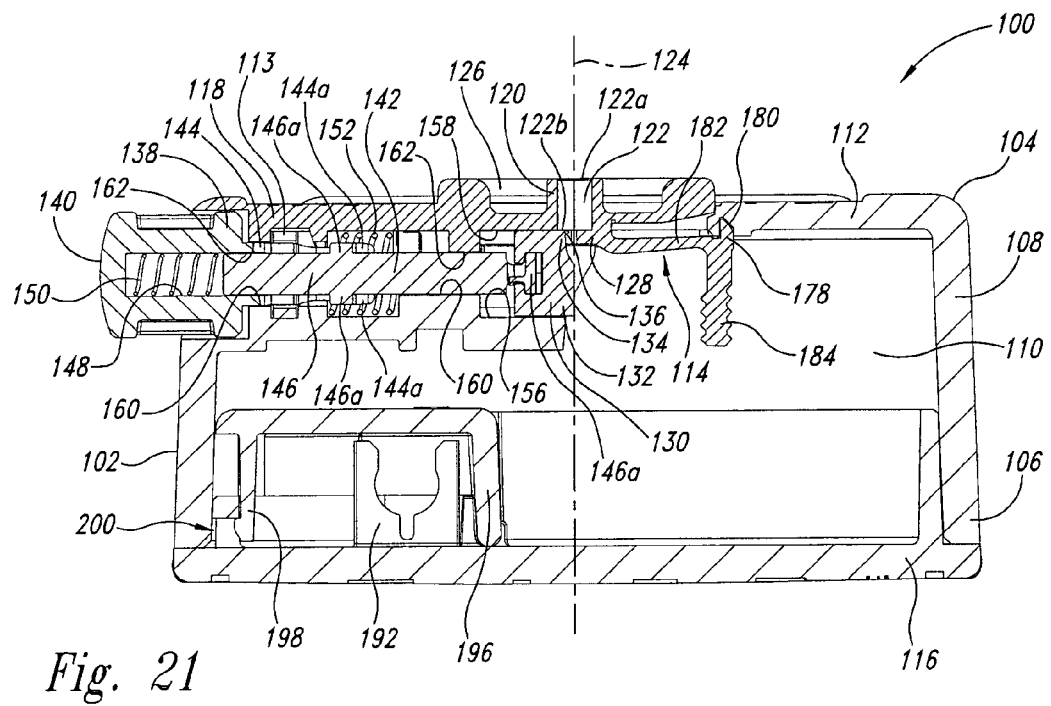
FIG. 21 is an enlarged, cross-sectional view of the fiber optic cleaver of FIG. 8 taken substantially along line 21—21 of FIG. 19.
Figure 22:
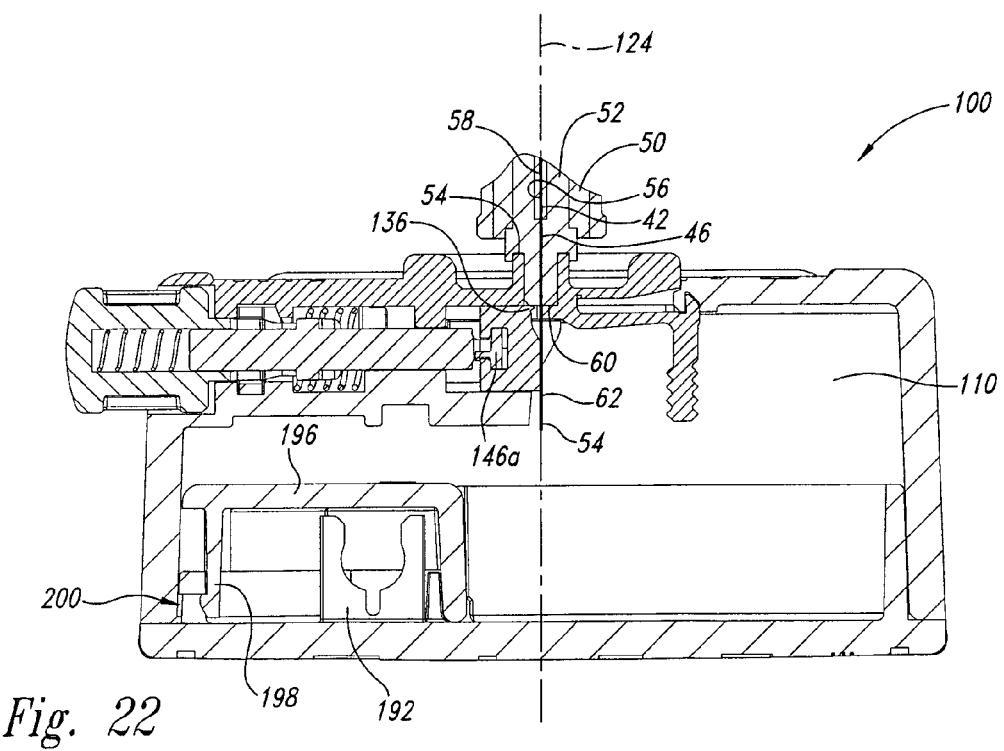
FIG. 22 shows the fiber optic cleaver as shown in FIG. 21 showing a portion of the prior art connector ferrule with the unsheathed optical fiber free end portion inserted into an opening in the fiber support member of the cleaver prior to being bent and cut, with the connector ferrule having an end portion of the unsheathed optical fiber extending therefrom.
Figure 23:
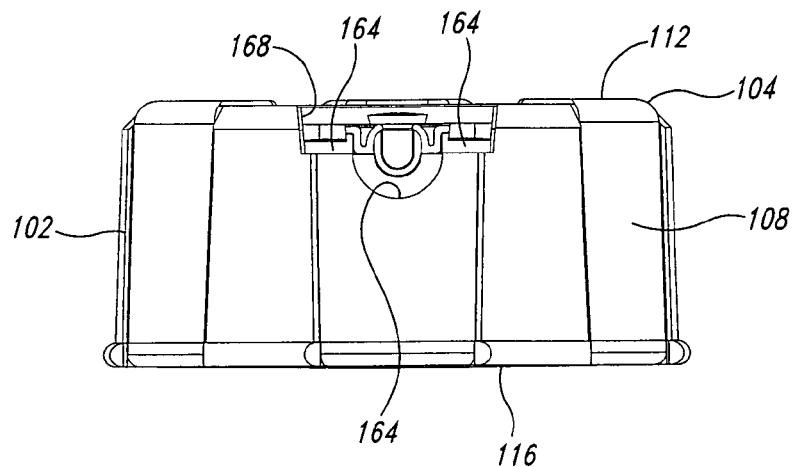
FIG. 23 is a reduced scale, side elevational view of the fiber optical cleaver of FIG. 8 with the fiber support member removed.

As with the housing port 16 of the prior art fiber cleaver 10, the housing port 120 of the fiber support member 118 has an elongated port opening 122, as best shown in FIGS. 19–21, formed as a cylindrical axial bore of the housing port. When the fiber support member 118 is attached to the housing endwall 112 of the housing 102 in position for use, the elongated port opening 122 is aligned with the housing endwall aperture 114, and extends between an exterior first end 122a opening exterior of the fiber support member and the housing 102, and an inward second end 122b communicating with the housing internal chamber 110. The elongated port opening 122 has a longitudinal axis 124 extending transverse to the housing endwall 112. As shown in FIG. 22, the elongated port opening 122 is sized to receive and snuggly hold therein during a cleaving operation the connector ferrule 52 and the unsheathed optical fiber end portion 46 of the optical fiber assembly 40 contained within the connector ferrule with a longitudinal axis of the both in general alignment with the longitudinal axis 124 of the elongated port opening. The free end portion 62 of the unsheathed optical fiber end portion 46 to be cleaved extends through the housing endwall aperture 114 and inward beyond the inward second end 122b of the elongated port opening 122 into the housing internal chamber 110. The bending and cleaving of the free end portion 62 of the unsheathed optical fiber end portion 46 of the optical fiber assembly 40 extending beyond the distal end 60 of the connector ferrule 52 occurs in the housing internal chamber 110.

An annular recess 126 is formed in the housing 102 which extends fully around the housing port 118. The annular recess 126 is sized and shaped to receive the end portion of the fiber optic connector 48 during use of the fiber cleaver 100 to cleave a fiber, with the housing port 120 of the fiber support member 118 seated within the connector housing recess 54 of the particular type or size fiber optic connector 48 for which the fiber support member is designed to operate.

Within the housing internal chamber 110, positioned a predetermined depth from the inward second end 122b of the elongated port opening 122, is a stop 128 proximate to the inward end of the elongated port opening. The stop 128 is formed as part of the fiber support member 118 and comprises a projection that is attached to the underside of the housing endwall 112. The stop 128 projects partially across the inward second end 122b of the elongated port opening 122, along the longitudinal axis 124 of the elongated port opening, to be engaged by the distal end 60 of the connector ferrule 52 when the connector ferrule is inserted into the elongated port opening. The stop 128 holds the connector ferrule distal end 60 at a predetermined position against further movement of the connector ferrule 52 toward the housing internal chamber 110 with the free end portion 62 of the unsheathed optical fiber end portion 46 which extends beyond the connector ferrule distal end extending into the housing internal chamber 110.

Positioned directly across from the stop 128 is a fiber bending and cleaving head 130 movably supported by the housing endwall 112 which acts upon the free end portion 62 of the unsheathed optical fiber end portion 46 to be cleaved. The head 130 is retained between the housing endwall 112 and an inward side of the fiber support member 118. The head 130 is mounted for movement within the housing internal chamber 110 adjacent to the inward second end 122b of the elongated port opening 122, in a direction transverse to the longitudinal axis 124 of the elongated port opening 122. The head 130 is reciprocally moveable inward and outward with the inward movement being along an inward travel path having a direction transverse to the longitudinal axis 124 of the elongated port opening 122 and hence the longitudinal axis of the free end portion 62 of the unsheathed optical fiber end portion 46 to be cleaved when inserted into and extending through the elongated port opening.

The head 130 has an inward facing fiber bending portion 132 and an inward facing fiber cutting portion 134 with the fiber bending portion extending inward beyond the fiber cutting portion to contact the free end portion 62 of the unsheathed optical fiber end portion 46 before the fiber cutting portion as the head moves along the inward travel path. The fiber bending portion 132 is located spaced apart from the inward second end 122b of the elongated port opening 122 along the longitudinal axis 124 of the elongated port opening, and the fiber cutting portion 134 is located between the fiber bending portion and the inward second end of the elongated port opening along the longitudinal axis of the elongated port opening and adjacent to the inward second end of the elongated port opening. The fiber cutting portion 134 of the head 130 includes a fiber cutting blade 136 located spaced apart from the stop 128 along the longitudinal axis 124 of the elongated port opening 122 to cleave the free end portion 62 of the unsheathed optical fiber end portion 46 extending out of the opening of the connector ferrule passageway 56 to a first length extending beyond the connector ferrule distal end 60.

In the embodiment of the head 130 shown in FIGS. 9, 21, 22, 27 and 31, the head 130 is machined as a single, solid part made of tungsten-carbide, with the fiber cutting blade 136 formed as an integral portion of the head 130. In the alternative embodiment of the head 130 shown in FIGS. 28 and 32, the head is made of stainless steel except for the fiber cutting blade 136, which is as a separate part and fixedly mounted to the body of the head. The fiber cutting blade 136 in this embodiment is made from a material such as diamond.

With both embodiments of the head 130, the head is movable along the inward travel path for cleaving of the free end portion 62 of the unsheathed optical fiber end portion 46 from an initial position whereat the head permits the fiber to be inserted into the elongated port opening 122 and extend through and beyond the inward second end 122b of the elongated port opening and into the housing internal chamber 110 with the fiber bending and fiber cutting portions 132 and 134 of the head out of contact with the fiber, through a first portion of the inward travel path and then through a second portion of the inward travel path to accomplish cleaving of the free end portion of the unsheathed optical fiber end portion, to a final position whereat the fiber is cleaved and the head can be returned to the initial position. The fiber bending portion 132 of the head 130 extends sufficiently inward beyond the fiber cutting portion 134 such that during the first travel portion the fiber bending portion contacts and bends the free end portion 62 of the unsheathed optical fiber end portion 46 to induce tension in the fiber with the fiber cutting portion remaining out of contact with the fiber. The fiber cutting portion 134 of the head 130 extends inward less than the fiber bending portion 132 such that during the second travel portion the fiber cutting portion contacts and at least partially cuts or scores the free end portion 62 of the unsheathed optical fiber end portion 46 while the fiber bending portion continues to contact and increase the bend of the fiber to cause separation of the cut end (severed portion 66) of the fiber as the head is moved toward the final position.

The fiber cleaver 100 of the present invention further includes an actuation member 138 movably supported by a carriage portion of the housing endwall 112. The actuation member 138 is removably retained in the carriage portion of the housing endwall 112 between the housing endwall and an inward side of the fiber support member 118. The actuation member 138 has a user operable portion 140 positioned exterior of the housing 102 and projecting outward at the housing sidewall portion 108 for application of an inward force thereto by a user of the fiber cleaver 100, such as with the user's thumb, and an engagement portion 142 positioned to engage the head 130 and apply the inward force to the head to move the head along the inward travel path from the initial position to the final position.

In the illustrated embodiment of the invention, the user operable portion 140 of the actuation member 138 and the engagement portion 142 are formed of separate parts, each having a shaft 144 and 146, respectively. The user operable portion shaft 144 slidably receives in a longitudinally extending interior elongated chamber 148 thereof, in telescoping manner, the engagement portion shaft 146. A pair of elongated apertures 144a in the user operable shaft 144 each receives one of a pair of protrusions 146a on the engagement portion shaft 146 to couple the two shafts together but allow the shafts to slidably move longitudinally relative to each other, for reasons which will be described below. Positioned within the chamber 148 of the user operable portion 140, between an inward face of an outward distal endwall of the user operable portion and an outward end of the engagement portion shaft 146, is a relief spring 150. Thus, the relief spring 150 is positioned with one end engaging the user operable portion 140 and the opposite end engaging the engagement portion 142. The relief spring 150 is in a somewhat pre-compressed state and biases the user operable shaft 144 and the engagement portion shaft 146 longitudinally away from each other so that the protrusions 146a on the engagement portion shaft are moved to the longitudinally inward ends of the elongated apertures 144a in the user operable shaft.

Under normal conditions, the relief spring 150 simply transfers the user applied inward force applied to the user operable portion 140 of the actuation member 138 to the engagement portion 142 thereof to move the head 130 along the inward travel path. However, the relief spring 150 allows inward movement of the user operable portion 140 relative to the engagement portion 142 should the head 130 encounter resistance while moving along the inward travel path sufficient to exceed the spring force of the relief spring. As such, if the head 130 engages only the normal resistance from cleaving a fiber, the relief spring 150 will not compress significantly and essentially the entire inward force applied to the user operable portion 140 by the user will be transmitted to the engagement portion 142 and to the head for bending and cleaving of the fiber. However, if the head 130 should experience sufficient resistance, rather than applying the entire force applied by the user to the user operable portion 140, which might be increased above the normal force used and for which the fiber cleaver 100 is constructed, the relief spring 150 will begin to further compress and thereby limit the force experienced by the head against the fiber. This will tend to protect the head 130, and more specifically the fiber cutting blade 136 from damage as a result of the user applying excessive force in such situations. This can happen, as an example, if dried epoxy used in connection with the fiber optic connector 48 having the fiber being cleaved gets onto the portion of the fiber engaged by the fiber cutting blade 136. When the relief spring 150 compresses, the protrusions 146a on the engagement portion shaft 146 moves from the longitudinally inward end of the elongated apertures 144a in the user operable shaft 144 toward the longitudinally outward end of the elongated apertures 144a. Before the protrusions 146a will reach the longitudinally outward end of the elongated apertures 144a in the user operable shaft 144, the inward travel of the user operable portion 140 is stopped by a pair of lugs 154, which project laterally outward from the inward end of the user operable portion shaft 144, engaging endwalls of an elongated recesses in the housing end wall 112 within which the lugs are slidably received.

The fiber cleaver 100 also includes a return member, in the form of a coil return spring 152, arranged to apply a longitudinally outward force to the user operable portion 140 of the actuation member 138 to return the user operable portion to its initial position corresponding to the initial position of the head 130 when the inward force applied by the user on the user operable portion is sufficiently removed. The return spring 152 is supported by the housing endwall 112 and retained between the housing endwall and an inward side of the fiber support member 118. The return spring 152 also applies the longitudinally outward force to the head 130, through the protrusions 146a on the engagement portion shaft 146 engaging the longitudinally inward end of the elongated apertures 144a in the user operable shaft 144, to move the head outward along an outward travel path between the final position and the initial position when the inward force applied by the user on the user operable portion 140 is sufficiently removed.

The return spring 152 has an axial opening with the engagement portion shaft 146 extending therethrough. A first end portion of the return spring 152 engages the pair of lugs 154 projecting from the inward end of the user operable portion shaft 144 and a second end portion of the return spring engages the housing endwall 112, thereby the return spring applies the longitudinally outward return force on the user operable portion shaft 144 which moves the user operable portion 140 and the head 130 outward to their initial positions.

In such fashion, after insertion of the free end portion 62 of the unsheathed optical fiber end portion 46 through the elongated port opening 122 of the fiber support member 118 and into the housing internal chamber 110, the head 130 is moved along the inward travel path by applying the inward force on the user operable portion 140 of the actuation member 138 to sequentially bend, and then cut and further bend the fiber to cleave off the cut end (severed portion 66) of the free end portion 62 of the unsheathed optical fiber end portion 46. Then, after the inward user applied force is removed, the return spring 152 returns the user operable portion 140 and the head 130 to their initial positions for another fiber to be inserted into the elongated port opening 122 to be cleaved.

Figure 27:
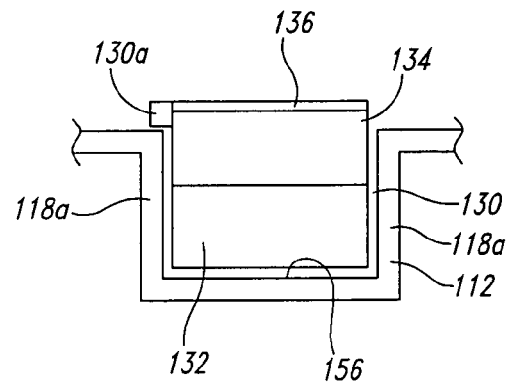
FIG. 27 is an enlarged scale, elevational end view of the fiber bending and cleaving head shown in FIGS. 21 and 22 within the cleaver housing shown in fragmentary view.
Figure 28:
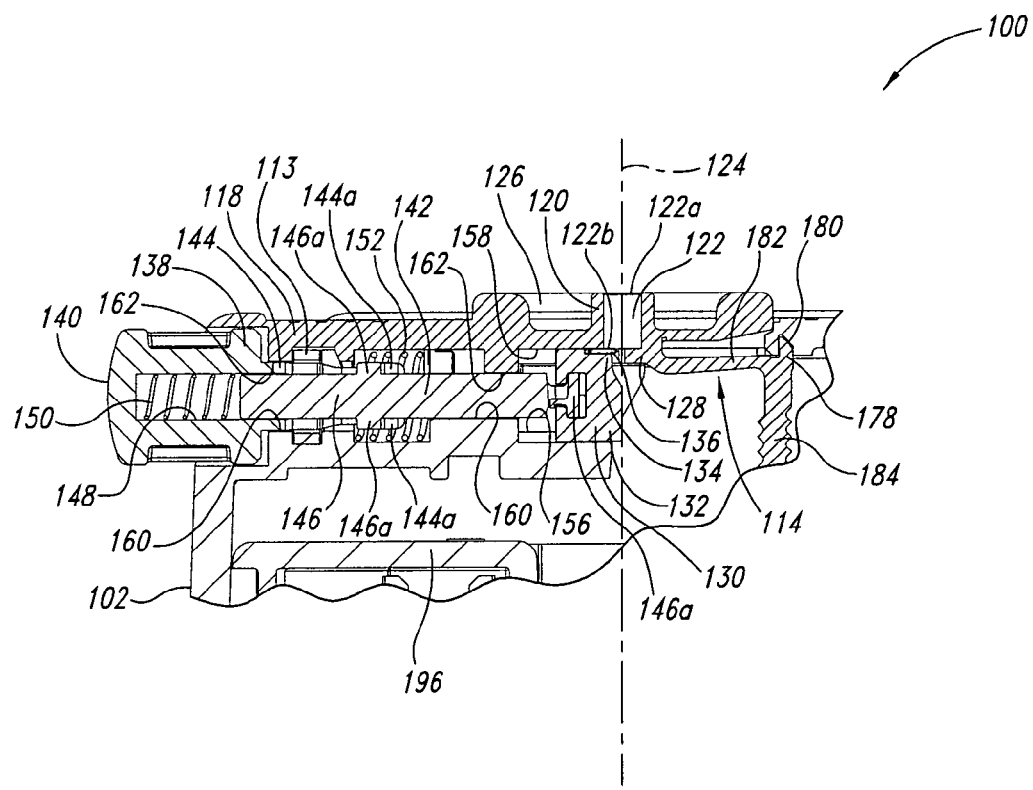
FIG. 28 is a fragmentary, cross-sectional view corresponding to the view shown in FIG. 21 using an alternative design for the fiber bending and cleaving head.
Figure 29:
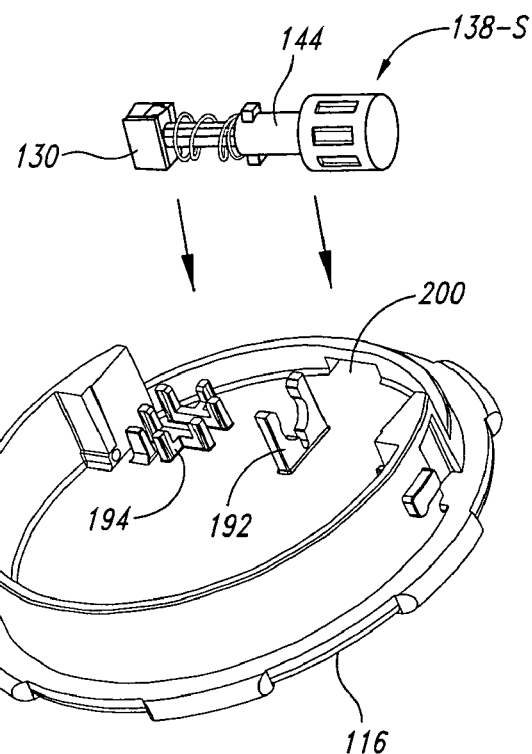
FIG. 29 is perspective view of the endcap of the optical fiber cleaver of FIG. 8 with the hinged cover thereof removed and with a spare fiber bending and cleaving head mounted on an actuation member shown positioned for insertion into the holder portion of the endcap.
Figure 30:
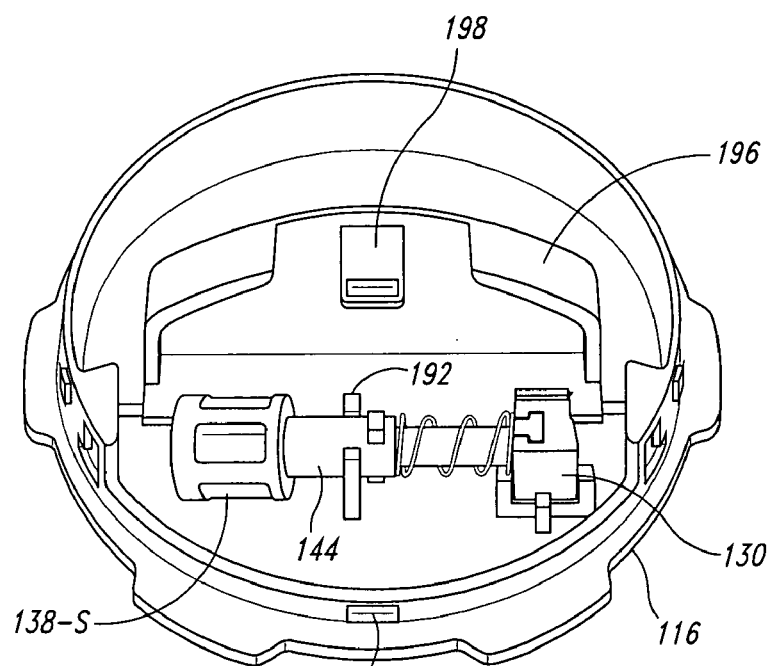
FIG. 30 is an enlarged perspective view of the endcap of FIG. 29 with the hinged cover open and the spare fiber bending and cleaving head and actuation member stored it the endcap holder portion.

The housing endwall 112 of the fiber cleaver 100 has a first slider surface portion 156 and the fiber support member 118 includes a second slider surface portion 158 opposing and spaced apart from the endwall first slider surface to slidably retain the head 130 therebetween as the head is moved along the inward and outward travel paths. As best seen in FIG. 27, the fiber support member 118 includes a pair of outwardly extending walls 118a with the head 130 positioned therebetween to restrict the lateral movement of the head as it moves along the inward and outward travel paths supported between the first and second slider surfaces 156 and 158. The head 130 includes a key 130a projecting laterally outward of one side thereof at a location above the one wall 118a of the fiber support member 118. The key 130a requires that the head 130 be installed with the correct orientation relative to the first slider surface 156 of the housing endwall 112, with the fiber cutting blade 136 above the fiber bending portion 132.

The housing endwall 112 also includes inwardly and outwardly located first guide portions 160 and the fiber support member 118 also includes inwardly and outwardly located second guide portions 162 opposing and spaced apart from the endwall first guide portions. The outwardly located first and second guide portions 160 and 162 slidably retaining the user operable shaft 144 of the actuation member 138 therebetween, and the inwardly located first and second guide portions slidably retaining the engagement shaft portion 146 of the actuation member therebetween as the inward force on the user operable portion 140 of the actuation member is applied to move the head 130 along the inward and outward travel paths. To more securely hold the actuation member 138 in place when positioned on the housing endwall 112 during assembly, such as when the actuation member 138 is being replaced, the housing endwall 112 has a clip 113 positioned at the outwardly located first guide portion 160 which releasably holds the user operable shaft 144 when snap fitted therein while allowing the longitudinal movement of the user operable shaft 144 during operation of the actuation member 138. The head 130 and the actuator member 138 are removable as a unit from the first slider surface portion 158 and first guide portions 160 of the housing endwall 112 when the fiber support member 118 is disconnected from the housing endwall.

Figure 31:
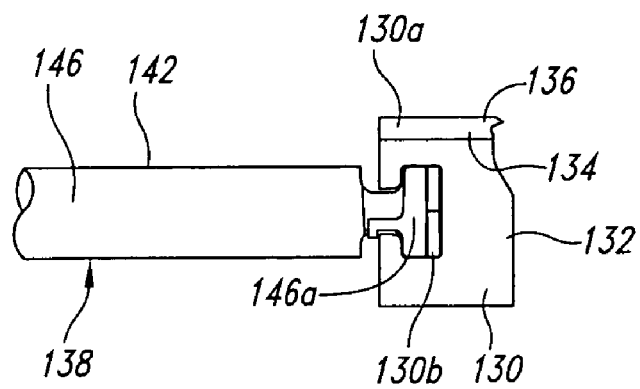
FIG. 31 is a fragmentary, enlarged side elevational view of the fiber bending and cleaving head shown in FIGS. 21, 22 and 27.
Figure 32:
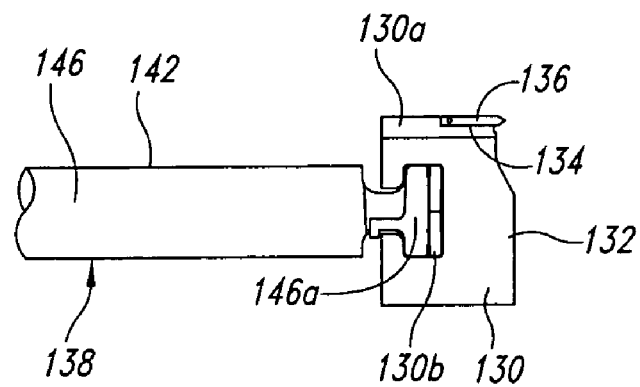
FIG. 32 is a fragmentary, enlarged side elevational view of the alternative design for the fiber bending and cleaving head shown in FIG. 28.

In the illustrated embodiment of the fiber cleaver 100, the head 130 and the inward end of the engagement portion shaft 146 of the actuation member 138 are removably attached together. The outwardly facing end of the head 130 has a "C" shape with a laterally extending slot 130b sized to slidably receive and retain an inward end portion 146a of the engagement portion shaft 146 therein, as best seen in FIGS. 21, 31 and 32. While the head 130 is removably attached to the engagement portion shaft 146, when the fiber cutting blade 136 is damaged or worn, for convenience of handling, the actuation member 138 and head 130 will typically be removed from the carriage portion of the housing endwall 112 as a unit and replaced, rather than replacing just the head 130. Alternatively, the head 130 could be fixedly attached to the engagement portion shaft 146 of the actuation member 138.

As noted above, the fiber support member 118 is removably connected to the housing endwall 112. The housing endwall 112 has a pair of spaced apart retainer slots 164 located toward the housing sidewall portion 108 (see FIG. 23), and the fiber support member 118 has a pair of spaced apart, inwardly projecting fingers or retainer members 166 positioned and sized to fit into the retainer slots when the fiber support member is moved into an engaged position whereat the fiber support member is connected to and retained in position on the housing endwall for use of the fiber cleaver 100. The fiber support member 118 is moveable between the engaged position and an unengaged position whereat the fiber support retainer members 166 are withdrawn from the housing endwall retainer slots 164 and the fiber support member can be disconnected from the housing endwall 112.

Figure 24:
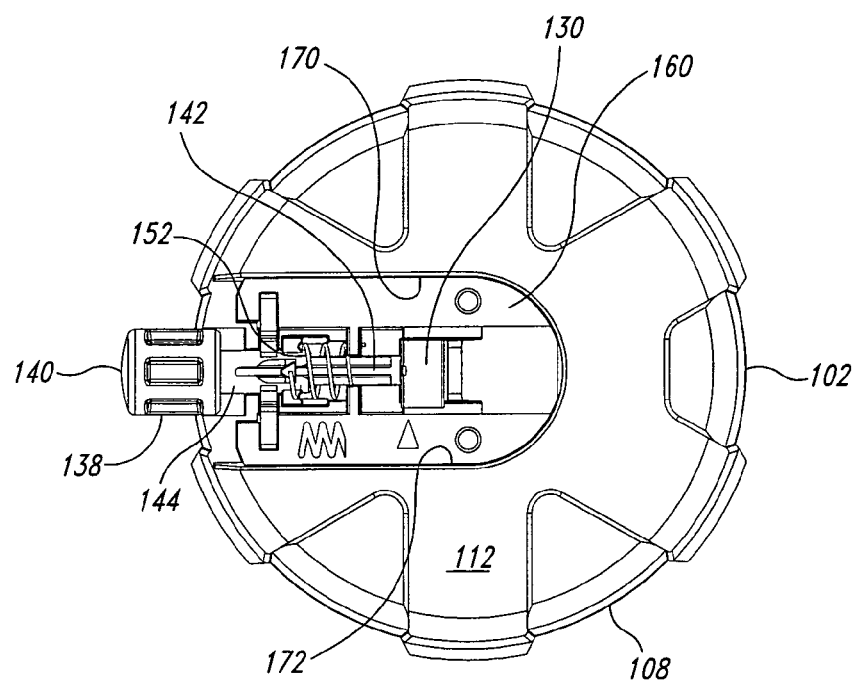
FIG. 24 is a reduced scale, top plan view of the fiber optical cleaver of FIG. 8 with the fiber support member removed.
Figure 25:
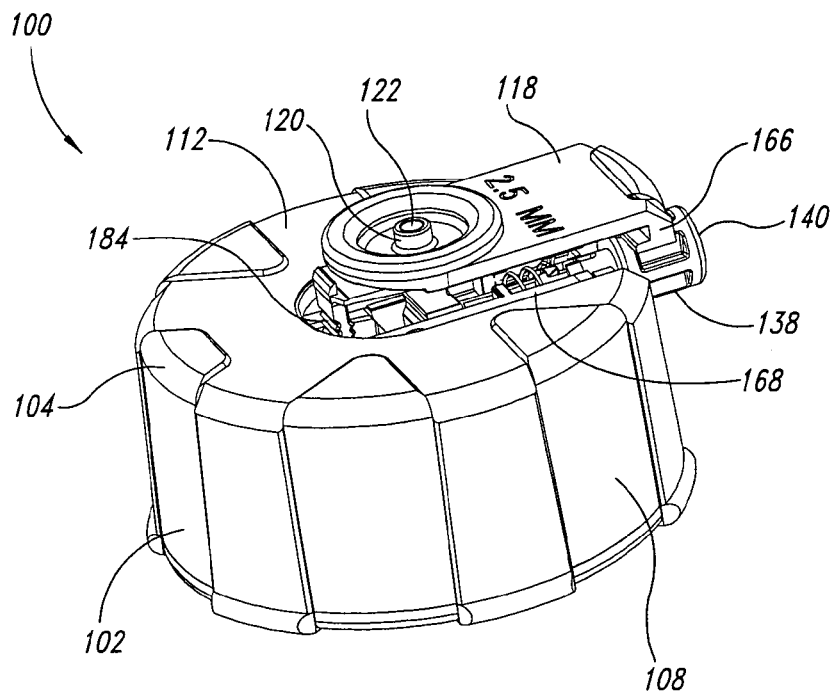
FIG. 25 is a reduced scale, top perspective view of the fiber optic cleaver of FIG. 8 with the fiber support member disconnected from and positioned above the cleaver housing.
Figure 26:
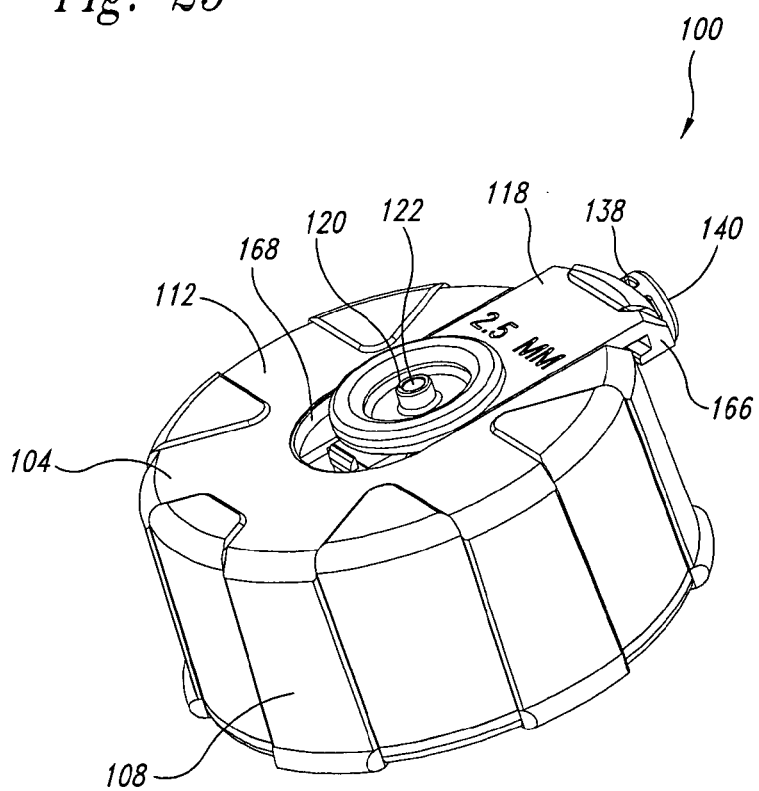
FIG. 26 is a reduced scale, top perspective view of the fiber optic cleaver of FIG. 8 with the fiber support member positioned at the cleaver housing but not in the engaged position.

As best seen in FIG. 9, the housing endwall 112 has a recess 168 sized and shaped to receive the fiber support member 118 therein and permit the sliding movement of the fiber support member within the housing endwall recess between the unengaged and engaged positions along a path of movement. FIG. 24 shows the housing 102 with the fiber support member 118 fully removed. FIG. 25 shows the fiber support member 118 positioned above the housing endwall recess 168, which is the position both prior to insertion of the fiber support member into the housing endwall recess and after removal therefrom. FIG. 26 shows the fiber support member 118 in the housing endwall recess 168 and ready to be slid inward to move the retainer members 166 into the retainer slots 164.

The housing endwall 122 within the housing endwall recess 168 has planar surface portions positioned to slidably engage planar surface portions on an underside of the fiber support member 118 when the fiber support member is received in the housing endwall recess. The housing endwall recess 168 also has spaced apart first and second recess sidewalls 170 and 172 extending along the path of movement and the fiber support member 118 has first and second fiber support member sidewalls 174 and 176 configured to engage the first and second recess sidewalls, respectively, when the fiber support member is in housing endwall recess, especially when moved into the engaged position to restrict movement of the fiber support member in a direction transverse to the path of movement.

The fiber support member 118 includes an upwardly projecting member or catch 178 releasably engageable with a catch recess 180 in the inward side of the housing endwall 112 and sized for the catch to fit therein to lock the fiber support member to the housing endwall. The catch 178 is mounted on a forwardly projecting plate 182 of the fiber support member 118 that extends under the housing endwall 112 when the fiber support member is moved into the engaged position in the housing endwall recess 168. The plate 182 has a downwardly projecting tab 184 which can be engaged by the finger of a user extending through the housing internal chamber 110 from the second housing end 106 of the housing 102 when the endcap 116 is removed to flex the plate 182 sufficiently to allow the catch 178 to be dislodged from the catch recess 180. This unlocks the fiber support member 118 from the housing endwall 112 and allows the fiber support member to be slid outward in the housing endwall recess 168 and disconnected from the housing endwall. As previously noted, the endcap 116 is attached to the second housing end 106 during use of the fiber cleaver 100 and thus prevents unintentional user contact with the tab 184 which releases the catch 178 to avoid accidental unlocking of the fiber support member 118 from the housing endwall 112 when the user handles the fiber cleaver while cleaving fibers.

A carrying holster 186 for carrying the fiber cleaver 100 is shown in FIG. 9. The holster 186 has a pocket 188 sized and shaped to removably receive the fiber cleaver 100. The holster 186 further includes a belt clip 190 for clipping the holster to a waist belt, work apron or other flat item.

With the fiber cleaver 100 of the present invention, a user can conveniently carry as many fiber support members 118 as necessary to cleave the fibers of the particular type and size fiber optic connectors he is likely to encounter in the field, and can quickly and easily remove one fiber support member for one particular type and size fiber optic connector from the housing endwall 112 of the housing 102 and replace it the fiber support member for a different type and/or size fiber optic connector. This eliminates the need to purchase and carry different complete fiber cleaver units for each type and size fiber optic connector likely to be encountered. Each of the fiber support members 118 has a housing port 120 and other features to fit the type and size fiber optic connector for which it is designed, but all fiber support members are sized and shaped to be releasably connected to the same housing 102 and operate to cleave a fiber using the same fiber bending and cleaving head 130 and other components of the fiber cleaver 100. Since the fiber support members 118 may be made of a relatively inexpensive material, and have an inexpensive construction, the cost of owning several different fiber support members is very acceptable. Further, since the fiber support member 118 can be removed and replaced with a different type/size fiber support member without replacement of any other components of the fiber cleaver 100, the cost of owning several different fiber support members to use for different type/size fiber optic connectors is minimal compared to purchasing entirely separate prior art fiber cleavers for each type/size fiber optic connector.

With the fiber cleaver 100, should the head 130 need replacement, such as because the fiber cutting blade 136 becomes dull or damaged, the fiber support member 118 connected to the housing 102 is simply disconnected and the actuation member 138 and the head 130 attached thereto removed as a unit from the housing endwall 112 and replaced with a new unit. Alternatively, the head 130 could be removed from the actuation member 138 and a new head attached, or the engagement portion shaft 146 could be disconnected from the user operable portion shaft 144 and with the head 130 attached thereto removed from the housing endwall 112 and replaced with a new engagement portion shaft and head.

When replacing the head 130 of the fiber cleaver 100 of the present invention, there is no inward adjustment required to set the spacing of the head relative to the actuation member components as with the prior art fiber cleaver 10 to achieve satisfactory operation and avoid damage to the new blade 36. This is because the relief spring 150 allows the head to stop inward movement should the fiber cutting blade 136 go too far inward and engage something other than the fiber. The fact that the fiber cleaver 100 eliminates this need for adjusting the position of the head relative to the actuation member required with the prior art fiber cleaver 10, the replacement of the head 130 can be done quicker and with less effort. This also allows the head 130 to be fixedly attached to the engagement portion shaft 146 if desired.

As previously noted, the endcap 116 is attached during use of the fiber cleaver 100 to the second housing end 106 of the housing 102 to close the second housing end to retain the severed ends of cleaved fibers within the housing internal chamber 110. In addition and as best shown in FIGS. 9, 22, 29 and 30, the endcap 116 also provides storage for a spare actuation member 138-S with a head 130 attached thereto. The actuation member used as a spare will include the user operable portion 140 and the engagement portion 142 with the relief spring 150 and the return spring 152 fully assembled, and will have the head 130 mounted on the inward end portion 146a of the engagement portion shaft 146.

An inward face of the endcap 116 has a clip 192 attached thereto which releasably holds the user operable shaft 144 of the spare actuation member 138-S when snap fitted therein. A plurality of inward projections 194 spaced apart to receive and hold therebetween the head 130 attached to the spare actuation member 138-S. To avoid the severed ends of the cleaved fibers retained within the housing internal chamber 110 from getting tangled up with the spare actuation member and head, the area of the inward face of the endcap 116 where the clip 192 and projections 194 are located is covered with a hinged door 196 that defines a closed storage area within the housing internal chamber 110 free from fiber severed ends. After use of the fiber cleaver 100 to cleave fibers, replacment of a damaged or worn head 130 is necessary, the endcap 116 can be easily removed and the severed fiber ends within the housing internal chamber 110 (external of the closed storage area) dumped out into a disposal container. The hinged door 196 can be opened to gain access to the clean storage area where the spare actuation member 138-S and head 130 are stored. A resilient catch arm 198 is provided on the hinged door 196 to releasably retain the hinged door in a closed position when the fiber cleaver 100 is in use cleaving fibers. A rim portion of the endcap 116 has an aperture 200 into which a protrusion on the catch arm 198 projects.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

While the invention has been disclosed herein in connection with certain embodiments and detailed descriptions, it will be clear to one skilled in the art that modification or variations of such details can be made without deviating from the gist of this invention, and such modifications or variations are considered to be within the scope of the claims hereinbelow.

What is claimed is:

1. A device for cleaving optical fibers of at least first and second category fiber optic connectors where the first and second category fiber optic connectors have connector ferrules of different sizes and an optical fiber extending through the connector ferrule and beyond a connector ferrule distal end, comprising:

a fiber cutting member configured to cleave the fiber;

a housing with an internal chamber, the housing including a recess sized to receive the fiber cutting member therein; and first and second fiber alignment members removably and alternatively connectable to the housing, the first and second fiber alignment members each having first and second portions, the first portion spanning the housing recess and defining between the first portion and the housing a space having an outward opening and being accessible from exterior of the housing when the alignment member is disconnected from the housing, the space being sized to receive the fiber cutting member therein between the housing and the alignment member, the fiber cutting member being removably retained in the space by the first portion when the alignment member is connected to the housing, the fiber cutting member being removable from the space through the outward opening thereof when the alignment member is disconnected from the housing, the second portion of the first fiber alignment member having a connector ferrule mating member with a first size to mate with the connector ferrule of the first category of fiber optic connectors and the second portion of the second fiber alignment member having a connector ferrule mating member with a second size to mate with the connector ferrule of the second category of fiber optic connectors, the first and second sizes of the connector ferrule mating members of the first and second fiber alignment members being different, the connector ferrule mating members of the first and second fiber alignment members each having an opening therethrough which, when the corresponding first and second fiber alignment member is connected to the housing, extends between an exterior end opening exterior of the connector ferrule mating member and the housing, and an inward end communicating with the housing internal chamber, the opening of the connector ferrule mating member of the first fiber support member being sized to receive the connector ferrule of the first category of fiber optic connectors with the fiber thereof extending beyond the connector ferrule distal end passing through the inward end of the opening and into the housing internal chamber for cleaving by the fiber cutting member, and the opening of the connector ferrule mating member of the second fiber support member being sized to receive the connector ferrule of the second category of fiber optic connectors with the fiber thereof extending beyond the connector ferrule distal end passing through the inward end of the opening and into the housing internal chamber for cleaving by the fiber cutting member.

2. A device for cleaving optical fibers comprising:

a housing with an internal chamber;

a fiber alignment member removably connected to the housing and defining a space between the housing and the alignment member, the space having an outward opening and being accessible from exterior of the housing when the alignment member is disconnected from the housing, the alignment member having an opening, when the alignment member is connected to the housing the opening extends between an exterior end opening exterior of the housing and an inward end communicating with the housing internal chamber, the opening being sized to receive an optical fiber to be cleaved, the opening permitting the fiber to extend inward beyond the inward end of the opening and into the housing internal chamber; and a fiber cutting member positioned in the space between the housing and the alignment member, and removably retained therein by the alignment member, the fiber cutting member being movably supported in the space by the housing and the alignment member when the alignment member is connected to the housing and mounted to cleave the fiber inserted into the opening and cause separation of a cut end of the fiber within the housing internal chamber, the fiber cutting member being configured to be removable from the space through the outward opening thereof when the alignment member is disconnected from the housing, the fiber cutting member including a fiber engagement portion, the housing including a first slider surface portion and the alignment member including a second slider surface portion opposing and spaced apart from the first slider surface to slidably retain the fiber engagement portion therebetween, the fiber engagement portion being unrestrained by the second slider surface of the alignment member and removable from the space through the outward opening thereof when the alignment member is disconnected from the housing.

3. A device for cleaving optical fibers comprising:

a fiber cutting member configured to cleave the fiber;

a housing with an internal chamber, the housing including a recess sized to receive the fiber cutting member therein; and a fiber alignment member removably connected to the housing and having first and second portions, the first portion spanning the housing recess and defining between the first portion and the housing a space having an outward opening and being accessible from exterior of the housing when the alignment member is disconnected from the housing, the space being sized to receive the fiber cutting member therein between the housing and the alignment member, the fiber cutting member being removably positioned in the space and retained therein by the first portion when the alignment member is connected to the housing, the fiber cutting member being removable from the space through the outward opening thereof when the alignment member is disconnected from the housing, the second portion having an opening, when the alignment member is connected to the housing the opening extends between an exterior end opening exterior of the housing and an inward end communicating with the housing internal chamber, the opening being sized to receive an optical fiber to be cleaved, the opening permitting the fiber to extend inward beyond the inward end of the opening and into the housing internal chamber for cleaving by the fiber cutting member and thereby causing separation of a cut end of the fiber within the housing internal chamber, the housing including a first guide portion and the alignment member including a second guide portion opposing and spaced apart from the housing first guide portion to movably retain the fiber cutting member therebetween, the fiber cutting member being unrestrained by the second guide portion of the alignment member and removable from the space through the outward opening thereof when the alignment member is disconnected from the housing.

4. A device for cleaving optical fibers comprising:

a housing with an internal chamber, the housing including a housing endwall extending across an end of the internal chamber and having an aperture therethrough;

an alignment member removably connected to the housing endwall at the housing endwall aperture and having a guide with an elongated opening, when the alignment member is connected to the housing endwall the elongated opening is aligned with and passes through the housing endwall aperture and extends between an exterior end opening exterior of the housing and an inward end communicating with the housing internal chamber, the elongated opening having a longitudinal axis and being sized to receive an optical fiber to be cleaved, the elongated opening holding the fiber with a longitudinal axis of the fiber in general alignment with the longitudinal axis of the elongated opening and permitting the fiber to extend inward beyond the inward end of the elongated opening and into the housing internal chamber;

a fiber cutting blade;

a head movably supported by the housing and mounted for movement within the housing internal chamber adjacent to the inward end of the elongated opening, the head being reciprocally moveable inward and outward with the inward movement being along an inward travel path having a direction transverse to the longitudinal axis of the elongated opening and hence to the longitudinal axis of the fiber when inserted into and extending through the elongated opening, the head having an inward facing fiber bending portion and a blade support portion, the blade support portion supporting the fiber cutting blade with the fiber cutting blade facing inward, the fiber bending portion extending inward beyond the fiber cutting blade to contact the fiber before the fiber cutting blade as the head moves along the inward travel path, the fiber bending portion being located spaced apart from the inward end of the elongated opening along the longitudinal axis of the elongated opening, and the blade support portion supporting the fiber cutting blade between the fiber bending portion and the inward end of the elongated opening along the longitudinal axis of the elongated opening and adjacent to the inward end of the elongated opening, the head being movable along the inward travel path for cleaving of the fiber from an initial position whereat the head permits the fiber to be inserted into the elongated opening and extend through and beyond the inward end of the elongated opening and into the housing internal chamber with the fiber bending portion of the head and the fiber cutting blade out of contact with the fiber, through a first portion of the inward travel path and then through a second portion of the inward travel path to accomplish cleaving of the fiber, to a final position whereat the fiber is cleaved and the head can be returned to the initial position, the fiber bending portion of the head extending sufficiently inward beyond the fiber cutting blade such that during the first travel portion the fiber bending portion contacts and bends the fiber to induce tension in the fiber with the fiber cutting blade remaining out of contact with the fiber, and the fiber cutting blade extending inward less than the fiber bending portion such that during the second travel portion the fiber cutting blade contacts and at least partially cuts the fiber while the fiber bending portion of the head continues to contact and increase the bend of the fiber to cause separation of a cut end of the fiber as the head is moved toward the final position;

an actuation member movably supported by the housing and having an engagement portion positioned to engage the head and apply the inward force to the head to move the head along the inward travel path from the initial position to the final position; and a user operable member positioned for application of a user applied force thereto from the exterior of the housing and configured to apply at least a portion of the user applied force to the actuation member to supply the inward force to the head, whereby after insertion of the fiber through the elongated opening of the guide and into the housing internal chamber, the head is moved along the inward travel path by applying the user applied force on the user operable member to sequentially bend, and then cut and further bend the fiber to cleave off the cut end of the fiber.

5. The cleaving device of claim 4 further including a return member supported by the housing and arranged to apply an outward force to the head to move the head outward along an outward travel path between the final position and the initial position when the inward force on the head is sufficiently removed.

6. The cleaving device of claim 4 for use with a fiber optic connector having a connector ferrule with a passageway extending to a passageway opening at a distal end of the connector ferrule and with the fiber extending through the connector ferrule passageway and out of the connector ferrule passageway opening and extending beyond the connector ferrule distal end, wherein the elongated opening of the guide is sized to receive the connector ferrule and the alignment member further includes a stop proximate to the inward end of the elongated opening, the stop being arranged to engage the connector ferrule distal end and hold the connector ferrule distal end at a predetermined position against further movement toward the housing internal chamber with the fiber extending beyond the connector ferrule distal end and into the housing internal chamber, the fiber cutting blade being located spaced apart from the stop along the longitudinal axis of the elongated opening to cleave the fiber extending out of the connector ferrule passageway opening to a first length extending beyond the connector ferrule distal end.

7. The cleaving device of claim 4 wherein the head and the engagement portion of the actuation member are removably attached together.

8. The cleaving device of claim 4 wherein the alignment member retains the head and the actuation member in position supported by the housing when the alignment member is connected to the housing, and the head and the actuation member are removable from the housing when the alignment member is disconnected from the housing endwall.

9. The cleaving device of claim 4 further including a relief spring positioned to transfer the user applied force applied to the user operable member to the actuation member to move the head along the inward travel path, while allowing inward movement of the user operable member relative to the actuation member when the head encounters resistance while moving along the inward travel path sufficient to exceed a spring force of the relief spring.

10. The cleaving device of claim 4 wherein the head is movably supported by the housing in position between the housing endwall and the alignment member, the alignment member retaining the head in position supported by the housing between the housing endwall and the alignment member when the alignment member is connected to the housing endwall, and allowing the head to be removed from the housing when the alignment member is disconnected from the housing endwall.

11. The cleaving device of claim 4 wherein the head is movably supported by the housing in position between the housing endwall and the alignment member, and the actuation member is movably supported by the housing in position between the housing endwall and the alignment member, the alignment member retaining the head and the actuation member in position supported by the housing between the housing endwall and the alignment member when the alignment member is connected to the housing endwall, and allowing the head and the actuation member to be removed from the housing when the alignment member is disconnected from the housing endwall.

12. The cleaving device of claim 4 further including a return member supported by the housing in position between the housing endwall and the alignment member, the alignment member retaining the spring in position supported by the housing between the housing endwall and the alignment member when the alignment member is connected to the housing endwall, and allowing the spring to be removed from the housing when the alignment member is disconnected from the housing endwall, the spring being arranged to apply an outward force to the head to move the head outward along an outward travel path between the final position and the initial position when the inward force on the head is sufficiently removed.

13. The cleaving device of claim 4 wherein the housing endwall includes a recess and the alignment member is removably positioned in the housing endwall recess and retained therein against lateral movement when the alignment member is connected to the housing endwall.

14. The cleaving device of claim 4 wherein the housing further includes a receptacle removably attached to the housing endwall to receive and hold cut off ends of cleaved fibers.

15. A device for cleaving optical fibers comprising:
a housing with an internal chamber, the housing including a housing wall extending across an end of the internal chamber and having an aperture therethrough;
a fiber alignment member removably connected to the housing at the housing wall aperture, the alignment member defining a space between the housing wall and the alignment member, the space having an outward opening and being accessible from exterior of the housing when the alignment member is disconnected from the housing, the alignment member having an opening, when the alignment member is connected to the housing the opening is aligned with and passes through the housing wall aperture and extends between an exterior end opening exterior of the housing and an inward end communicating with the housing internal chamber, the opening being sized to receive an optical fiber to be cleaved, the opening permitting the fiber to extend inward beyond the inward end of the opening and into the housing internal chamber; and
a fiber cuffing member positioned in the space between the housing wall and the alignment member, and removably retained therein by the alignment member, the fiber cutting member being movably supported in the space by the housing wall and the alignment member when the alignment member is connected to the housing and mounted to cleave the fiber inserted into the opening and cause separation of a cut end of the fiber within the housing internal chamber, the fiber cutting member being configured to be removable from the space through the outward opening thereof when the alignment member is disconnected from the housing.

16. The cleaving device of claim 15 wherein the housing wall includes a recess and the alignment member includes first and second portions, the first portion spanning the housing wall recess and defining the space within which the fiber cutting member is positioned and the second portion spanning the housing wall aperture when the alignment member is connected to the housing, the first portion removably retaining the fiber cutting member in the space, and the second portion having the opening and being positioned to align the opening with the housing wall aperture and hold a fiber extending therethrough in position for cleaving by the fiber cutting member.

17. The cleaving device of claim 15 wherein the fiber cutting member includes a portion supporting a fiber cutting blade, and the alignment member retains the blade supporting portion of the fiber cutting member in position supported by the housing when the alignment member is connected to the housing, and wherein the alignment member includes a first portion defining the space within which the fiber cutting member is positioned and a second portion having the opening, the second portion being positioned at and spanning the housing wall aperture when the alignment member is connected to the housing and positioned to align the opening with the housing wall aperture and hold a fiber extending therethrough in position for cleaving by the fiber cutting blade.

18. The cleaving device of claim 17 wherein the blade supporting portion and the blade are formed as a single, integral part.

19. The cleaving device of claim 15 further including an actuation member movably supported by the housing and having an engagement portion positioned to engage the fiber cutting member and apply an inward force thereto to move the fiber cutting member along an inward travel path toward the fiber inserted into the opening to cleave the fiber, and a user operable member positioned for application of a user applied force thereto from the exterior of the housing and configured to apply at least a portion of the user applied force to the actuation member to supply the inward force to the fiber cutting member.

20. The cleaving device of claim 19 further including a relief spring positioned to transfer the user applied force applied to the user operable member to the actuation member to move the fiber cutting member along the inward travel path, while allowing inward movement of the user operable member relative to the actuation member when the head encounters resistance while moving along the inward travel path sufficient to exceed a spring force of the relief spring.

21. The cleaving device of claim 20 wherein the relief spring is positioned to compress and thereby generate the spring force as the user continues to apply the user applied force to the user operable member when the fiber cutting member encounters resistance while moving along the inward travel path sufficient to exceed the spring force.

22. The cleaving device of claim 19 further including a relief spring, and wherein the user operable member has a shaft and the actuation member has a shaft, the user operable member and actuation member shafts being slidably connected together with the relief spring positioned to engage both the user operable member and actuation member to transfer the user applied force applied to the user operable member to the actuation member to move the fiber cutting member along the inward travel path, while allowing inward movement of the user operable member relative to the actuation member when the fiber cutting member encounters resistance while moving along the inward travel path sufficient to exceed a spring force of the relief spring.

23. The cleaving device of claim 19 wherein the actuation member is at least in part positioned in the space between the housing wall and the alignment member, and removably retained therein by the alignment member, the actuation member being movably supported in the space by the housing wall and the alignment member when the alignment member is connected to the housing and configured to be removable from the space through the outward opening thereof when the alignment member is disconnected from the housing.

24. The cleaving device of claim 15 wherein the fiber cutting member includes a fiber engagement portion, and wherein the housing including a first slider surface portion and the alignment member including a second slider surface portion opposing and spaced apart from the first slider surface portion to slidably retain the fiber engagement portion therebetween, the fiber engagement portion being unrestrained by the second slider surface portion of the alignment member and removable from the space through the outward opening thereof when the alignment member is disconnected from the housing.

25. The cleaving device of claim 15 further including a return member positioned in the space and removably retained therein by the alignment member, the return member being supported by the housing in position in the space between the housing wall and the alignment member when the alignment member is connected to the housing, and configured to be removable from the space through the outward opening thereof when the alignment member is disconnected from the housing, the return member being arranged to apply an outward force to the fiber cutting member to move the fiber cutting member outward after the fiber is cleaved.

26. The cleaving device of claim 15 wherein the housing wall includes a recess extending at least partially about the space and the alignment member is removably positioned in the housing wall recess and retained therein against lateral movement when the alignment member is connected to the housing.

27. The cleaving device of claim 15 wherein the housing further includes a receptacle removably attached to the housing wall to receive and hold cut off ends of cleaved fibers.

* * * * *